US011125553B2

(12) United States Patent
Chen et al.

(10) Patent No.: US 11,125,553 B2
(45) Date of Patent: Sep. 21, 2021

(54) MOTION SENSOR ASSISTED ROOM SHAPE RECONSTRUCTION AND SELF-LOCALIZATION USING FIRST-ORDER ACOUSTIC ECHOES

(71) Applicants: Biao Chen, Jamesville, NY (US); Tiexing Wang, Nanchong (CN); Fangrong Peng, Wuhan (CN)

(72) Inventors: Biao Chen, Jamesville, NY (US); Tiexing Wang, Nanchong (CN); Fangrong Peng, Wuhan (CN)

(73) Assignee: SYRACUSE UNIVERSITY, Syracuse, NY (US)

( * ) Notice: Subject to any disclaimer, the term of this patent is extended or adjusted under 35 U.S.C. 154(b) by 433 days.

(21) Appl. No.: 15/631,046

(22) Filed: Jun. 23, 2017

(65) Prior Publication Data
US 2017/0370710 A1    Dec. 28, 2017

Related U.S. Application Data

(60) Provisional application No. 62/354,482, filed on Jun. 24, 2016.

(51) Int. Cl.
| | | |
|---|---|---|
| *G01B 17/00* | (2006.01) | |
| *G01S 15/08* | (2006.01) | |
| *G01S 15/89* | (2006.01) | |
| *G01S 15/06* | (2006.01) | |

(52) U.S. Cl.
CPC ............ *G01B 17/00* (2013.01); *G01S 15/06* (2013.01); *G01S 15/08* (2013.01); *G01S 15/89* (2013.01)

(58) Field of Classification Search
CPC ......... G01B 17/00; G01S 15/08; G01S 15/89; G01S 15/06
See application file for complete search history.

(56) References Cited

U.S. PATENT DOCUMENTS

| | | | | |
|---|---|---|---|---|
| 7,831,413 B2* | 11/2010 | Date | ...................... | G01H 17/00 702/189 |
| 2002/0062695 A1* | 5/2002 | Ohta | ......................... | H04S 7/30 73/645 |
| 2004/0240676 A1* | 12/2004 | Hashimoto | ............. | H04S 7/305 381/56 |
| 2007/0019815 A1* | 1/2007 | Asada | .................... | H04R 29/00 381/58 |
| 2007/0124144 A1* | 5/2007 | Johnson | ................. | H04L 69/40 704/246 |

(Continued)

*Primary Examiner* — Isam A Alsomiri
*Assistant Examiner* — Amie M Ndure
(74) *Attorney, Agent, or Firm* — Bond Schoeneck & King, PLLC; David Nocilly

(57) ABSTRACT

Simultaneous 2-D room shape reconstruction and self-localization is accomplished using no pre-established infrastructure. A mobile device with co-located microphone and loudspeaker is used to collect echoes reflected by the walls. The system uniquely recovers arbitrary 2-D convex room shape as well as the position of mobile device 10 by collecting and processing distances between three consecutive measurement points as well as acoustic echoes from the device. A practical algorithm for room shape reconstruction and self-localization in the presence of noise and higher order echoes is proposed. Experimental results are provided to demonstrate the effectiveness of the approach.

12 Claims, 17 Drawing Sheets

(56) References Cited

U.S. PATENT DOCUMENTS

| | | | | |
|---|---|---|---|---|
| 2007/0286404 | A1* | 12/2007 | Popovic | H04B 3/237 |
| | | | | 379/406.01 |
| 2013/0096922 | A1* | 4/2013 | Asaei | G01S 3/8006 |
| | | | | 704/270 |
| 2013/0301391 | A1* | 11/2013 | Altman | G01S 13/003 |
| | | | | 367/100 |
| 2014/0112487 | A1* | 4/2014 | Laska | H04M 9/082 |
| | | | | 381/66 |
| 2014/0180629 | A1* | 6/2014 | Dokmanic | G01S 15/46 |
| | | | | 702/150 |
| 2016/0287166 | A1* | 10/2016 | Tran | H04W 4/80 |
| 2017/0332909 | A1* | 11/2017 | Nagae | A61B 8/4494 |
| 2020/0086078 | A1* | 3/2020 | Poltorak | A61B 5/4809 |

* cited by examiner

MOTION SENSOR ASSISTED ROOM SHAPE RECONSTRUCTION AND SELF-LOCALIZATION USING FIRST-ORDER ACOUSTIC ECHOES

CROSS-REFERENCE TO RELATED APPLICATIONS

The present application claims priority to U.S. Provisional Application No. 62/354,482, filed on Jun. 24, 2016.

BACKGROUND OF THE INVENTION

1. Field of the Invention

The present invention relates to simultaneous indoor localization and, more particularly, to room shape reconstruction using a single mobile computing device.

2. Description of the Related Art

With the development of mobile devices, many applications related to public safety, medical care, or commercial use become available by using sensory information collected by the devices. In many cases, these applications highly rely on the localization feature provided by the devices. Therefore, localization becomes an integral part for applications where location information is critical.

Outdoor localization is largely considered as a solved problem. The satellite based Global Positioning System (GPS) is able to provide satisfactory accuracy and coverage in most outdoor environment. However, it cannot offer an acceptable performance for indoor localization, as the microwaves are easy to be heavily attenuated when penetrating the construction materials. In addition, the multipath propagation caused by the reflections on the construction surfaces leads to significant losses of localization accuracy.

Indoor localization has been an active research area in the recent years. Most works focus on the simultaneous localization and mapping (SLAM), which is able to build the map of the environment, while determining the device's position within the map. Several techniques have been demonstrated to be effective to accomplish indoor localization, such as those utilizing location specific signatures from WiFi, Bluetooth, UWB signals as well as LED light. Most existing techniques require some prior information about the surrounding environment, such as anchor nodes in UWB based system whose positions are fixed and known. Additionally, these techniques invariably require the availability of infrastructure that is functioning (i.e., powered up) during the localization and mapping process. There are applications, however, where indoor mapping and localization may be required in the absence of pre-established infrastructure. A simple example is the need of first responders when natural disaster may lead to a power outage that in turn renders any pre-established infrastructure inaccessible.

BRIEF SUMMARY OF THE INVENTION

The present invention comprises a device for performing simultaneous localization and mapping in an enclosed space having a loudspeaker capable of emitting a predetermined sound, a microphone co-located with the loudspeaker, a processor interconnected to the microphone, wherein the processor is programmed to receive a series of echoes of the predetermined sound when emitted by the loudspeaker from a corresponding series of non-collinear locations within the enclosed space and to determine shape of the enclosed space based on the series of echoes from the corresponding series of locations. The processor is programmed to determine the shape of the enclosed space by measuring the distance between each of the series of locations from a preceding one of the series of locations. The processor is programmed to determine the shape of the enclosed space by measuring the distance between each of the series of locations and all walls of the enclosed space. The processor is programmed to determine the shape of the enclosed space by identifying first order echoes from within the series of echoes received at each of the corresponding series of locations. The processor is programmed to determine shape of the enclosed space by reconstructing all possible shapes of the enclosed space and selecting the shape with the most number of edges. The processor is programmed to determine the location the series of non-collinear locations within the shape of the enclosed space. The predetermined sound may comprise a chirp signal sweeping from a first frequency to a second frequency, where the first frequency is 30 Hz and the second frequency is 8 kHz.

The invention thus involves a single mobile computing device that is equipped with a loud speaker and a microphone as well as various motion sensors that is programmed to perform room shape reconstruction. The requisite equipment are generally available in conventional smartphones and laptop computer which can be programmed using applications to implement the present invention. The invention provides a technology that allows simultaneous room shape recovery and self-localization without another external infrastructure. Mobile device 10 provides as a co-located acoustic transmitter and receiver that emits and receives acoustic echoes; together with the information gathered through internal sensors, the device can autonomously reconstruct any 2-D convex polygonal room shape while self-localizing with respect the reconstructed room shape.

The present invention also encompasses a method of performing simultaneous localization and mapping in an enclosed space, comprising the steps of providing a loudspeaker capable of emitting a predetermined sound, emitting the predetermined sound from the loudspeaker from each of a series of locations within the enclosed space, receiving a corresponding series of echoes of the predetermined sound from each of the series of locations with a microphone co-located with the loudspeaker, and using a processor interconnected to the microphone to determine shape of the enclosed space based on the series of echoes received from the corresponding series of locations.

The method of the present invention can thus use a single mobile device with acoustic features and motion sensors to simultaneously recover the room shape and localize the device itself. The effectiveness of the invention was demonstrated for SLAM in 2-D convex polygonal rooms. In the method of the invention, the mobile device serves as a co-located acoustic transmitter and receiver. Specifically, it transmits a probing signal to excite the acoustic response in the indoor environment, and receives and records the echoes. By measuring the time of arrival (ToA) of the echoes, the distance between mobile device 10 and each reflector (wall) can be recovered. Then to establish the environment infrastructure through the ToA information, it is proved that the transmission-reception process needs to be done for at least three times at three distinct non-collinear positions. Moreover, to obtain better performance of infrastructure reconstruction, the inertial sensors mounted in the mobile device, such as the accelerometer and magnetometer, are used to track the trajectory of itself. However, the motion direction information estimated by the inertial sensors are known to be highly inaccurate, and will not lead to acceptable performance for localization and mapping. Therefore, in this method, only the path lengths, i.e., the distance between the consecutive measurement points, are estimated and used. Given the ToA information collected at three distinct non-collinear measurement points and the distance information between consecutive measurement points, the developed technology can reconstruct any convex polygon in 2-D, as well as localize the device itself using acoustic echoes. Thus, in the technique of the present invention, 2-D SLAM can be achieved by using the acoustic functions and motion sensors of a single mobile device, without any pre-established infrastructure or external power supply.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
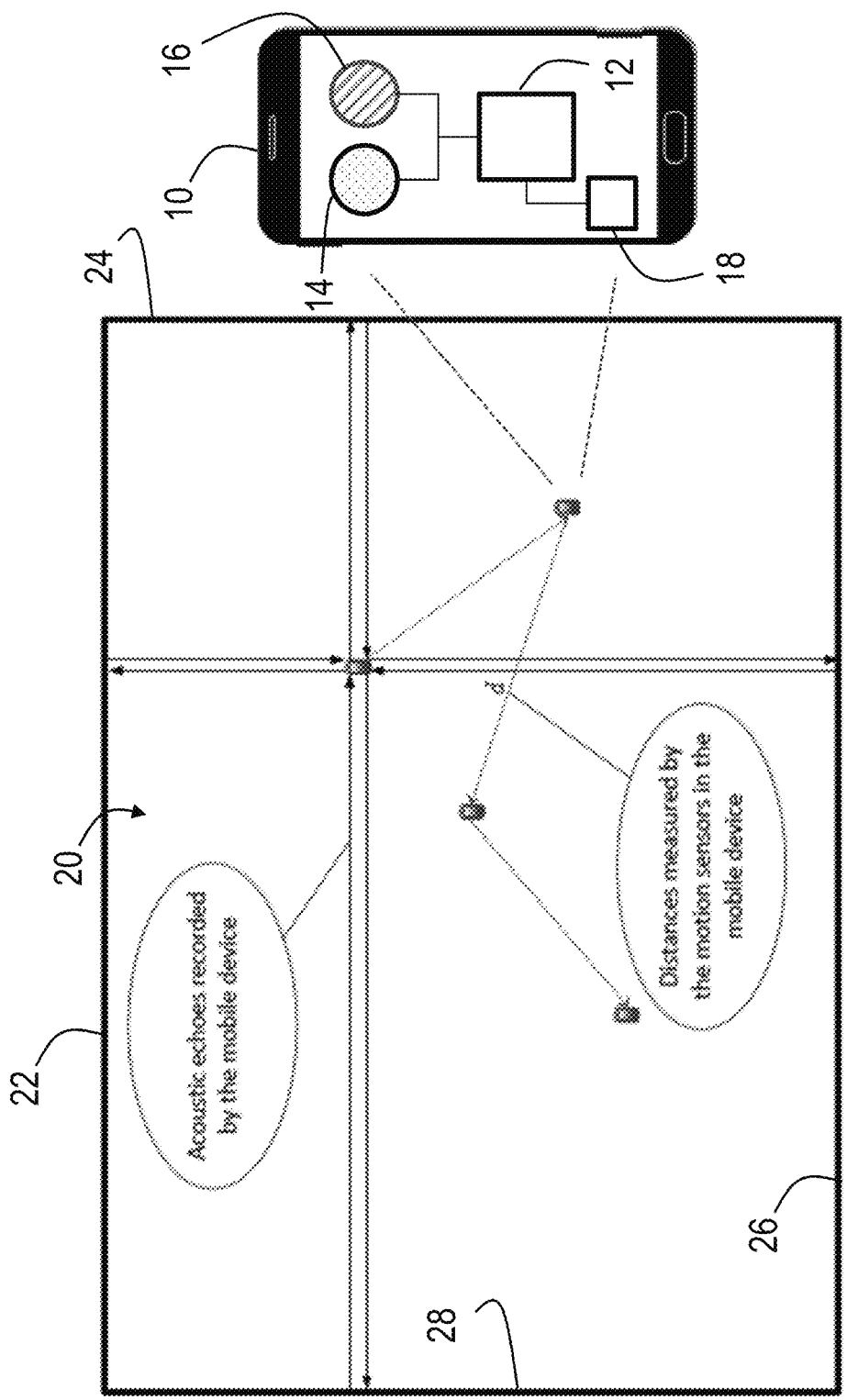
FIG. 1 is a schematic of a room shape reconstruction system according to the present invention.

Referring to the figures, wherein like numerals refer to like parts throughout, there is seen in FIG. 1 a mobile computer device 10 having an internal processor 12 as well as a co-located loudspeaker 14 and microphone 16 and a motion sensor 18, such as an accelerometer, that is programmed to use the data from loudspeaker 14, microphone 16, and motion sensor 18 for room shape reconstruction system according to the present invention. Mobile device 10 may be a conventional smartphone, laptop computer, etc. having the required components that is programmed via an application to perform the processing of signals received from located loudspeaker 14, microphone 16, and motion sensor 18.

As seen in FIG. 1, device 10 may be positioned inside a room 20 having a plurality of walls 22, 24, 26, and 28. Device 10 used to take measurements in different points of the room—at a minimum three measurement points that are not on the same line. For example, a user may hold device 10 and simply walk around the room so long as he or she is not traveling along a straight line. The measurements are processed together with the information extracted from internal sensors to recover 2-D room shape (which in the example of FIG. 1 is a simple rectangle) as well as the relative locations of all measurement points. Once this is accomplished, device 10 can easily track itself in real time as it travels around the room.

Figure 2:
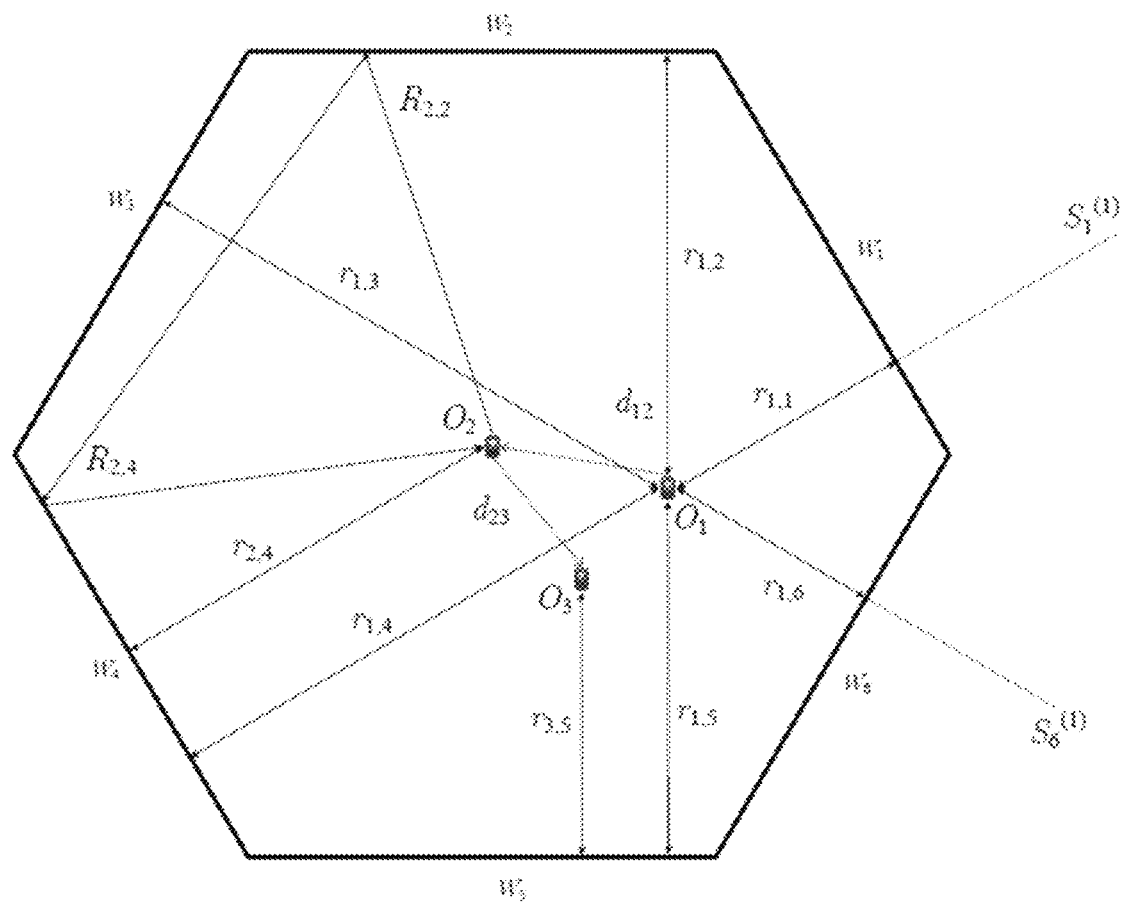
FIG. 2 is a schematic of the path of a mobile device for a room shape reconstruction system according to the present invention.

Mobile device 10 provides co-located loudspeaker 14 and microphone 16, and is moved around inside the room whose shape is to be reconstructed. At each measurement point, device 10 is programmed to emit a probing acoustic signal s(t) and receives and records the echoes r(t). As seen in FIG. 2, mobile device 10 is travelling along the path $O_1$-$O_2$-$O_3$ inside the polygonal room encompassed by six walls $W_1$-$W_6$. The proposed technique is able to reconstruct both the 2D room shape, i.e., $W_1$-$W_6$, and the device location $O_1$-$O_2$-$O_3$.

Image Source Model

The basic technique to link the acoustic echoes and the room shape begins with a classic model widely used in acoustics and optics, called image source model (ISM). In FIG. 2, the first-order image sources of $O_1$ with respect to the edge $W_1$ and $W_6$ are shown as $S_1^{(1)}$ and $S_1^{(6)}$. There are second-order, or even higher-order image sources, which induce high-order echoes, such as the reflecting paths $O_2$-$R_{2,2}$-$R_{2,4}$-$O_2$. To reconstruct the room shape, the parameters of interest are the distances between the source and each reflector (wall), which is precisely half the distance between the source and its first order images with respect to each wall. Suppose the distance between the i-th wall and the j-th source is denoted as $r_{j,i}$, it is related to the time of arrival (ToA) of each echo by the following formula:

$$\tau_i^{(j)} = \frac{r_{j,i}}{c},$$

where $\tau_i^{(j)}$ is the travelling time of the probing signal being reflected by the edge W and returning to the source $O_j$, and c is the speed of sound. Here, it is possible to assume the emission time is set at t=0.

All the distances collected at a single source are denoted as a vector $\vec{r}_j$. It is quite trivial to show three sets of distances $\vec{r}_j$, or equivalently, three sets of ToA information collected respectively at three distinct locations that are not co-linear inside the room are sufficient to reconstruct the room shape. As seen in FIG. 2, mobile device 10 moves along a random path, and collects information at at least three sources $O_1$-$O_3$.

Room Shape Reconstruction and Self-Localization with Known Path Lengths

With only first order echo information, it is conventionally known that without any additional information, such as relative distance of measurement points, it is impossible to reconstruct all 2-D convex polygons. In particular, if the room shape is a rectangle, it has been shown that there are infinite parallelograms of completely different shapes that yield the same set of first order echoes. However, with various internal sensors, it is now feasible using the present invention to measure, for example, the distance between two measurement points or even the angles if the user of device 10 walks along different straight lines after each measurement points. In the present invention, the distance information measured by motion sensor 18 between two neighboring measurement points is used to supply the necessary information. Specifically, the distances between $O_1$ and $O_2$, as well as between $O_2$ and $O_3$, which are denoted as $d_{12}$ and $d_{23}$ in FIG. 2, may be measured. With this additional information, the steps below may be used to establish the 2-D room shape while self-localizing with respect to the reconstructed room shape.

Peak Detection

To achieve better resolution for determining $\tau_i^{(j)}$, or equivalently $r_{j,i}$, wide-band signals are usually used. In the case of acoustic signals, a chirp signal is used as its auto-correlation provides a good approximation to the Dirac delta function. Therefore, to obtain the ToA information, the received signal r(t) is first convolved with the probing signal s(t). Whenever there is an echo (first or higher orders), a peak will occur at the output of the correlator. The first and most significant one corresponds to the light-of-sight (LOS) path (i.e., directly received by the microphone without reflecting off any wall). This LOS arrival time will be recorded and subtracted from subsequent echoes and differences are precisely the time each echo travels along a certain path. All detected echoes are collected into the distance set $\vec{r}_j$ at each source $O_j$.

Reconstruction for the Ideal Case

Figure 3:
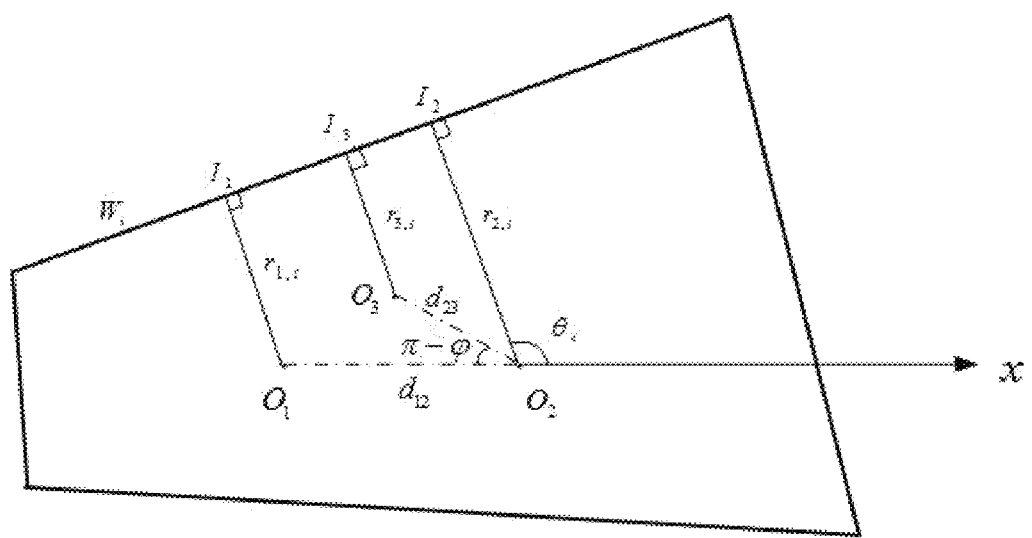
FIG. 3 is a schematic of the path angles in a room shape reconstruction system according to the present invention.

Consider a convex planar K—polygon as shown in FIG. 3. Without loss of generality, the origin of the coordinate system is fixed at $O_1$, and the x-axis is chosen to be towards $O_2$. As indicated in FIG. 3, the path angle is denoted as $\pi-\varphi$, which is assumed to be within $(0,\pi)$. Then, it is straightforward to show that $$(r_{2,i}-r_{1,i})+d_{12}\cos\theta_i=0, \quad (1)$$

$$(r_{3,i}-r_{2,i})+d_{23}\cos(\theta_i-\varphi)=0. \quad (2)$$

The ideal case refers to the case when echoes corresponding to different walls are correctly labeled at different nodes, and only the first-order echoes are present in the distance sets. Thus, in each $\vec{r}_j$, the $\vec{r}_{j,i}$'s are sorted in the same order as i=1, . . . , K though they may not arrive in this order. The system needs to determine the uniqueness of $\varphi$ and $\theta_i$'s according to (1) and (2). The solutions to (1) and (2) are given by:

$$\theta_i = \pm\arccos\left(-\frac{r_{2,i}-r_{1,i}}{d_{12}}\right), \quad (3)$$

$$\theta_i - \varphi = \pm\arccos\left(\frac{r_{3,i}-r_{2,i}}{d_{23}}\right). \quad (4)$$

and these two equations yield four possible sign combinations. However, there are only two sign combinations which satisfy (1) and (2) simultaneously for all i=1, . . . , K, and those two are reflections of each other with respect to $O_1O_2$.

Notice that in such a coordinate system, the first two sources are located at (0, 0) and ($d_{12}$, 0), and once $\varphi$ and $\theta_i$ are determined, the coordinate of $O_3$ is determined as well. Hence, the self-localization can be accomplished.

Echo Labelling

Practically, the received echoes are not correctly labeled at different measurement points, i.e., one does not know a priori which are the first order echoes corresponding to the same wall—notice that at different nodes, echoes from different walls may not arrive at the same order. In addition, $\vec{r}_j$ may contain high-order echoes. Therefore, the higher-order echoes have to be eliminated, and the first-order echoes have to be labeled in the correct order; this is done by trying different echo combinations to solve (1) and (2). With random measurement points, no solutions to (1) and (2) can be obtained for all i=1, . . . , K except for the correct set of first order echoes. The length of $\vec{r}_j$ is denoted as $N_j$, then N=min{$N_1,N_2,N_3$}. To find the correct labels of the echoes, each K out of N distances are selected from each distance set $\vec{r}_j$, and plugged into (3) and (4), to determine if they can yield a valid solution to (1) and (2) for all i=1, . . . ,K. As the actual number of walls is unknown in prior, K needs to vary from 3 to N, corresponding to polygons of varying number of sides. There may be multiple polygons satisfying (1) and (2), and among all these polygons, e.g., if the original shape is a pentagon, then it is possible that four set of first order echoes will also correctly solve (1) and (2), yielding a quadrilateral. Thus, the one with the most number of edges is chosen as the final reconstructed shape.

Self-Localizing

Once 2-D room shape is reconstructed after at least three measurement points, the coordinates of the three measurement points are automatically recovered in the process. Subsequently, echoes collected at other points are used to determine the location of those points, i.e., self-localization can be trivially accomplished.

Figure 4:
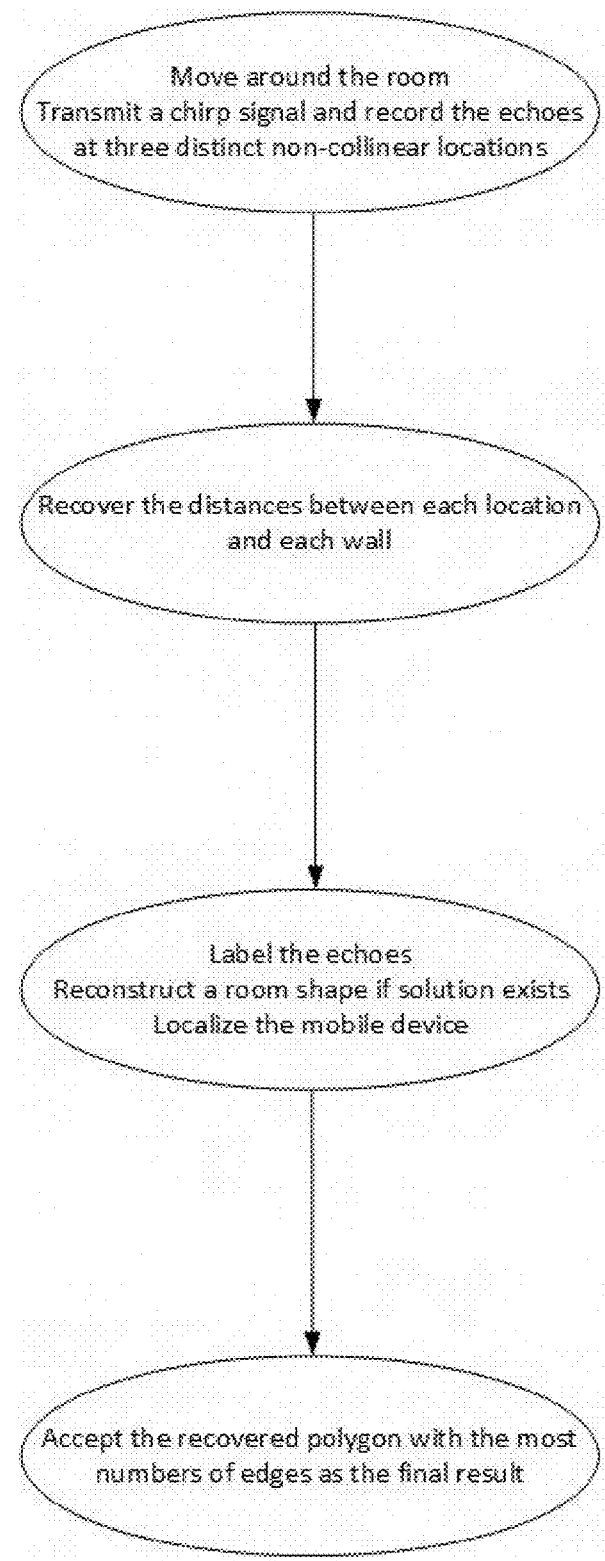
FIG. 4 is a flowchart of a process for room shape reconstruction according to the present invention.

The concrete steps of the system are seen in FIG. 4.

Room Impulse Response Model

Acoustic signal propagation from a loudspeaker to a microphone in a room can be described by the room impulse response (RIR), which can be formulated as the summation of both line-of-sight (LOS) and reflected components. In practice, if the microphone and loudspeaker are much closer to each other compared to the distance between the device and the walls, the device is referred to as a co-located device. For a co-located device at a measurement point denoted by $O_j$, the RIR is $$h^{(j)}(t) = \sum_i \alpha_i^{(j)}\delta(t-\tau_i^{(j)})$$

where $\alpha_i^{(j)}$'s and $\tau_i^{(j)}$'s are path gains and delays from the transmitter to the receiver, respectively. Since higher order reflective paths typically have much weaker power compared with the lower order ones, (1) can be approximately expressed by the first $N_j+1$ components including LOS and $N_j$ reflective paths:

$$h^{(j)}(t) \approx \sum_{i=0}^{N_j} \alpha_i^{(j)}\delta(t-\tau_i^{(j)}),$$

It is possible to assume that the N reflective paths contain all first order reflections and higher order ones that are detectable. Given the transmitted signal s(t), the received signal at $O_j$ is $$r^{(j)}(t)=s(t)*h^{(j)}(t)+\omega(t),$$

where $\omega(t)$ is the additive noise. $\tau_i^{(j)}$'s can be obtained from $r^{(j)}(t)$ if the $s(t-\tau_i^{(j)})$ decays before $s(t-\tau_{i+1}^{(j)})$ arrives at the receiver. However, it is difficult to generate such kind of acoustic signals which requires extremely wide bandwidth. A better way to obtain $\tau_i^{(j)}$'s is to consider the correlator output:

$$m^{(j)}(t)=r^{(j)}(t)*s(t).$$

If s(t) has nice auto-correlation property, the first peak of $m^{(j)}(t)$ corresponds to the LOS components, while other peaks correspond to reflective components. Hence the time difference of arrival (TDOA) can be obtained given asynchronous loudspeaker and microphone. This paper applies chirp signals which are easy to generate and have good auto-correlation properties.

Since the loudspeaker and microphone are co-located, $\tau_0$, which corresponds to the delay of the LOS path, is close to zero. Define a column vector $$\tilde{r}_j = \left\{ \frac{(\tau_i^{(j)} - \tau_0^{(j)})c}{2} \right\}_{i=1}^{N_j},$$

where c is the speed of sound. Then $\tilde{r}_j$ contains all the distances between the device and the walls. Hence synchronization between loudspeakers and microphones is not required for co-located device if only the distances between measurement point and the walls are of interest.

Image Source Model

Figure 5:
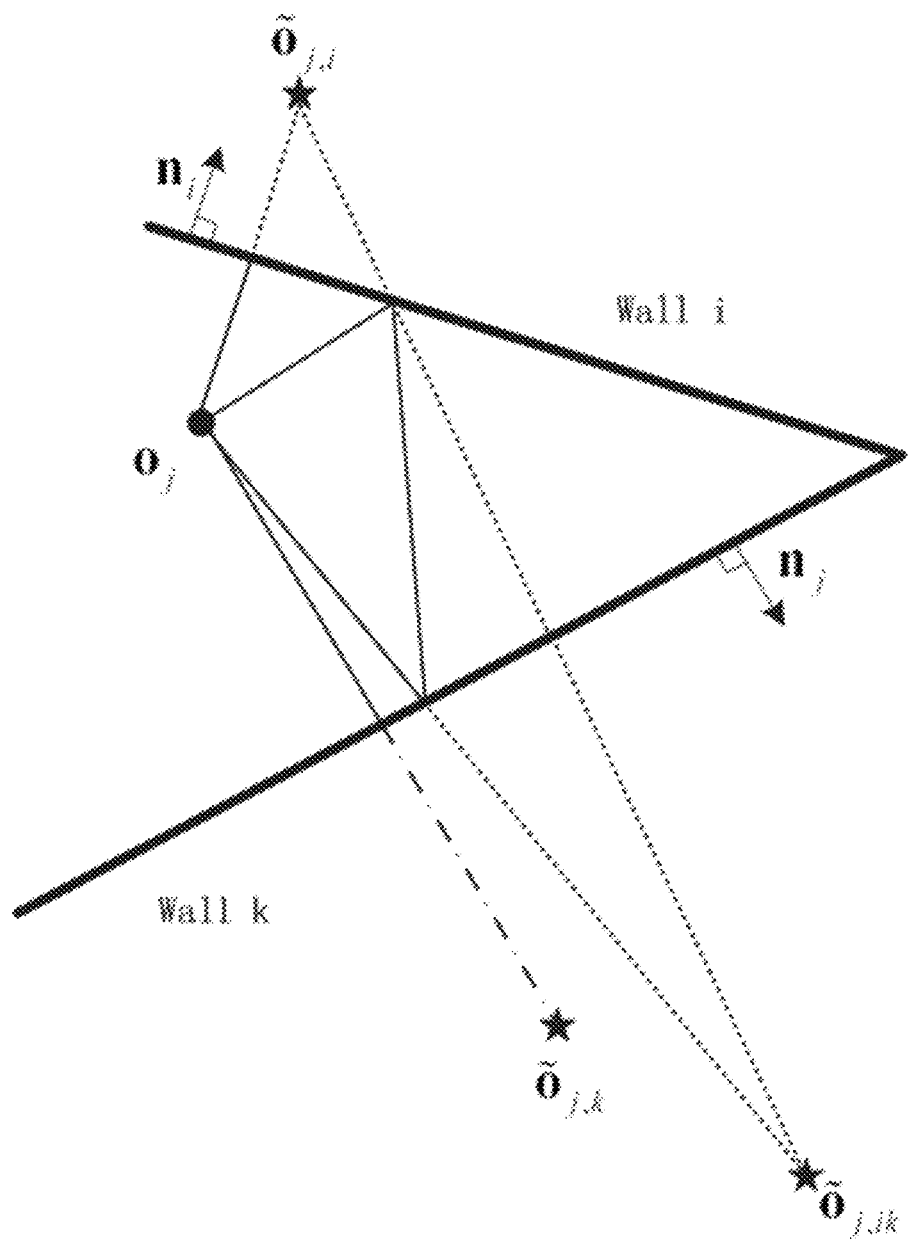
FIG. 5 is a schematic of an image source model according to the present invention.

By conventional image source model, reflections within a constrained space can be viewed as LOS propagation from virtual sources to the receiver in the free space. Suppose the coordinate of $O_j$ is denoted by $o_j$. As shown in FIG. 5, the first order image source of $O_j$ with respect to the ith wall is $$\tilde{o}_{j,i}=2\langle p_i-o_j,n_i\rangle +o_j,$$

where $p_i$ is any point on the ith wall and $n_i$ is the outward norm vector of the ith wall. Thus $$\tau_i^{(j)} = \frac{\|\tilde{o}_{j,i} - o_j\|_2}{c}.$$

Let $r_{j,i}$ be the distance between $O_j$ and the ith wall, then $r_{j,i}=\frac{1}{2}\tau_i^{(j)}c$ which is equal to half of the distance between $o_j$ and $\tilde{o}_{j,i}$. The second order image source of $O_j$ with respect to the ith and the kth wall is $$\tilde{o}_{j,ik}=2\langle p_k-\tilde{o}_{j,i},n_k\rangle +\tilde{o}_{j,i}.$$

Similarly, let $r_{j,ik}$ be half of the distance between $o_j$ and $\tilde{o}_{j,ik}$. Following the same step, higher order image sources can be represented by lower order image sources. Then $\tilde{r}_j$ is associated with image sources. The term echo is used to refer either the delay $\tau_i^{(j)}$ or the corresponding distance if no ambiguity occurs.

Two Extreme Cases

There are some special cases for room shape reconstruction and mobile device location. For instance, suppose distances between each pair of measurement points are given and the three measurement points are not collinear. In this case, only the room shape is of interest. By geometry, there exists at most one common tangent line for three circles with non-collinear centers. Thus, the room shape is uniquely determined by first-order echoes.

The second special case is when the reconstruction is free of geometry information of the measurement points. In this case, both room shape and the position of the device are of interest. The conventional art has shown that a large class of convex polygons can be reconstructed by first order echoes that are correctly labeled. The basic idea is that many convex polygons can be generated by the intersection of a triangle and some lines. As long as the triangle is obtained the coordinate of the measurement points are also determined. Therefore the rest of the reconstruction work is exactly the same as the previous case. However, parallelograms cannot be reconstructed uniquely under this assumption.

Recovery with Known Path Lengths

Geometry

Figure 6:
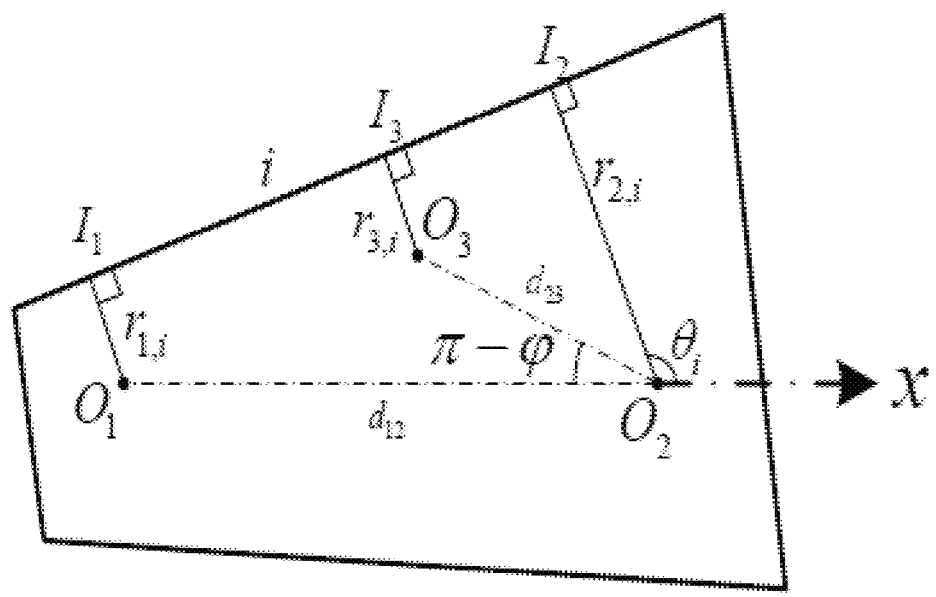
FIG. 6 is a schematic of room shape geometry according to the present invention.

Consider a convex planar K-polygon. As shown in FIG. 6, mobile device 10 with co-located loudspeaker 14 and microphone 16 emits pulses and receives echoes at $\{O_j\}_{j=1}^3$. Without loss of generality, we assume that $O_1$ is the origin, $O_2$ lies on the x-axis, and $O_3$ lies above the x-axis. Let $\varphi=(\pi-\angle O_1O_2O_3)\in(0,\pi)$ and the length of $O_1O_2$ and $O_2O_3$ denoted by $d_{12}$ and $d_{23}$, respectively.[1] Suppose mobile device 10 is capable of measuring its path length when moving from one place to another, i.e., $d_{12}$ and $d_{23}$ are known by the device. Our goal is to simultaneously determine the room shape and the coordinate of $O_3$ by first-order echoes.

If $\pi\in(0, 2\pi,$ i.e. we do not have control of where to place $O_3$, then the reconstruction is subject to reflection ambiguity (c.f. Theorem 3.3).

From FIG. 6, it is straightforward to show that $$(r_{2,i}-r_{1,i})+d_{12}\cos\theta_i=0,$$

$$(r_{3,i}-r_{2,i})+d_{23}\cos(\theta_i-\varphi)=0.$$

Ideal Case

Let $\{r_{j,i}\}_{i=1}^K$ be a column vector. Here, it is possible to assume that for all j's, the one-to-one mapping $f_j:r_j\mapsto \tilde{r}_j$ is known. In other words, $r_{j,i}$'s have been correctly chosen from $\tilde{r}_j$ for j=1, 2, 3 and i=1, . . . , K. In the rest of the paper, we say that the received echoes are grouped if echoes are chosen from $\tilde{r}_j$'s according to $f_j$'s. The remaining problem is to determine the uniqueness of $\theta_i$'s and $\varphi$ given (3) and (4).

Define $$\alpha_{ii'} = -\frac{r_{2,i}-r_{1,i'}}{d_{12}} \text{ and } \beta_{ii'} = -\frac{r_{3,i'}-r_{2,i}}{d_{23}}.$$

For simplicity we denote $\alpha_{i,i}$ and $\beta_{ii}$ by $\alpha_i$ and $\beta_i$, respectively. Given correctly labeled, by (3) and (4), we have $$\theta_i=\pm\arccos\alpha_i \text{ and } \theta_i-\varphi=\pm\arccos\beta_i. \quad (5)$$

Thus, there are four possible sign combinations for a given i, $$\theta_i=\arccos\alpha_i \text{ and } \theta_i-\varphi=\arccos\beta_i, \quad (6)$$

$$\theta_i=\arccos\alpha_i \text{ and } \theta_i-\varphi=-\arccos\beta_i, \quad (7)$$

$$\theta_i=\arccos\alpha_i \text{ and } \theta_i-\varphi=\arccos\beta_i, \quad (8)$$

$$\theta_i=\arccos\alpha_i \text{ and } \theta_i-\varphi=-\arccos\beta_i, \quad (9)$$

Definition III.1. Given a room R and a location O, O is feasible if the co-located device at O can receive all the first-order echoes of a signal emitted at O.

Lemma III.1. Suppose $O_1$, $O_2$ and $O_3$ are feasible and not collinear. Given grouped first-order echoes, with probability 1, there exist exactly two sign combinations such that (3) and (4) hold simultaneously for all i if $\varphi$ and the direction of both $\overrightarrow{O_1O_2}$ and $\overrightarrow{O_2O_3}$ are randomly chosen. The two possible sign combinations have opposite signs for $\varphi$ and all $\theta_i$'s and correspond to reflection of each other.

Proof.

Assume that the ground truth of the polygon is (6) for all $i \in \{1, \ldots, K\}$. Note that (6) implies that (9) holds for $\theta'_i = -\theta_i$ and $\varphi' = -\varphi$ for all i, which is the reflection of the room.

Suppose multiple sign combinations hold for a wall. Without loss of generality, let i=1. From (6) we have $$\varphi = \arccos \alpha_1 - \arccos \beta_1. \quad (10)$$

Assume that one of the following equations also holds, $$\varphi = -\arccos \alpha_1 - \arccos \beta_1, \quad (11)$$

$$\varphi = \arccos \alpha_1 + \arccos \beta_1, \quad (12)$$

$$\varphi = -\arccos \alpha_1 + \arccos \beta_1. \quad (13)$$

Then, the following three cases exist:

1) If (10) and (11) hold, $\theta_1 = 0$ which implies that $O_1O_2$ is perpendicular to the first wall, and $\varphi = -\arccos \beta_1$.

2) If (10) and (12) hold, $\arccos \beta_1 = 0$, which implies that $O_2O_3$ is perpendicular to the first wall.

3) If (10) and (13) hold, $\varphi = 0$, which contradicts with the assumption that $O_1$, $O_2$ and $O_3$ are not collinear.

With probability 1, the first two cases do not occur since both $\varphi$ and directions of $\overrightarrow{O_1O_2}$ and $\overrightarrow{O_2O_3}$ are randomly chosen.

If a subset of (7)-(9) holds for i and $i'$ simultaneously, then $(\theta_i, \theta_{i'}) \in \{\theta_i = 0, \theta_i = \varphi, \varphi = 0\} \times \{\theta_{i'} = 0, \theta_{i'} = \varphi, \varphi = 0\}$, which again, does not occur due to randomly chosen measurement points. Similarly, it can be shown that for more than two walls, (6) would imply none of (7)-(9) holds for all walls.

Echo Labeling

Since echoes may arrive in different orders at different $O_j$'s and $\tilde{r}_j$ contains higher order echoes if $N_j > K$, $f_j$ is unknown. Then $\theta_i$'s and $\varphi$ are also unknown. Therefore we need to find the mapping $f_j$ first. We can then estimate $\theta_i$'s, the room shape and the location of the device. We say the received echoes are ungrouped if echoes are chosen according to $f'_j \neq f_j$ for some j.

Lemma III.2. Given ungrouped echoes, with probability 1, there are only two possible cases:

1) there exist no solution to (3) and (4) given no parallel edges.

2) the reconstructed room shape has larger dimension with respect to parallel edges.

Proof. The proof is illustrated by considering only the case of K=4. The result can be easily extended to K=3 and K>4.

The ground truth is (6) for all i. Considering first parallelograms and excluding odd higher order echoes resulting from a pair of parallel walls. The distances between $O_j$ (j=1,2,3) and the four walls satisfy $$r_{1,1}+r_{1,2}=r_{2,1}+r_{2,2}=r_{3,1}+r_{3,2}=a \quad (14)$$

and $$r_{1,3}+r_{1,4}=r_{2,3}+r_{2,4}=r_{3,3}+r_{3,4}=b \quad (15)$$

We can see that for some $f_j$'s, pairs of $\{\alpha_{ii'}, \beta_{ii'}\}$ (i,i'$\in\{1, 2,3, 4\}$) are related to each other. Consider for example the $f_j$'s resulting in $\{a_{12}, a_{21}, a_{34}, a_{43}\}$ and $\{\beta_{12}, \beta_{21}, \beta_{34}, \beta_{43}\}$. Since $\alpha_{12}+\alpha_{21}=0$, $\alpha_{34}+\alpha_{43}=0$, $\beta_{12}+\beta_{21}=0$ and $\beta_{34}+\beta_{43}=0$, we have $$\arccos \alpha_{21} = \pi \pm \arccos \alpha_{12}$$

$$\arccos \alpha_{43} = \pi \pm \arccos \alpha_{34}$$

$$\arccos \beta_{21} = \pi \pm \arccos \beta_{12}$$

$$\arccos \beta_{43} = \pi \pm \arccos \beta_{34}$$

Thus (5) reduces to two equations.

$$\varphi = \pm \arccos \alpha_{12} \pm \arccos \beta_{12}$$

$$\varphi = \pm \arccos \alpha_{34} \pm \arccos \beta_{34}$$

With probability 1, these two equations do not hold simultaneously as $\alpha_{12}$, $\beta_{12}$ are independent of $\alpha_{34}$, $\beta_{34}$ due to randomly chosen measurement points. Other $f_j (\neq f_j)$'s always have at least two equations with independent choice of $\alpha$ and $\beta$. Hence no solution can be found for those instances.

Suppose $f'_j$'s are chosen such that we have $\alpha_{ii'}$ and $\beta_{ii'}$ (i≠i' i'≠i"). For rooms with no more than one pair of parallel walls, almost surely only echoes chosen according to $f_j$'s can make (6) holds for all i. This is because for those rooms, at least one of (14) and (15) does not hold. Thus some $\alpha_{ii'}$'s and $\beta_{ii'}$'s are not related since $r_{1i}$, $r_{2i'}$ and $r_{3i''}$ are randomly chosen from $\tilde{r}_1$, $\tilde{r}_2$, $\tilde{r}_3$, respectively.

Figure 7:
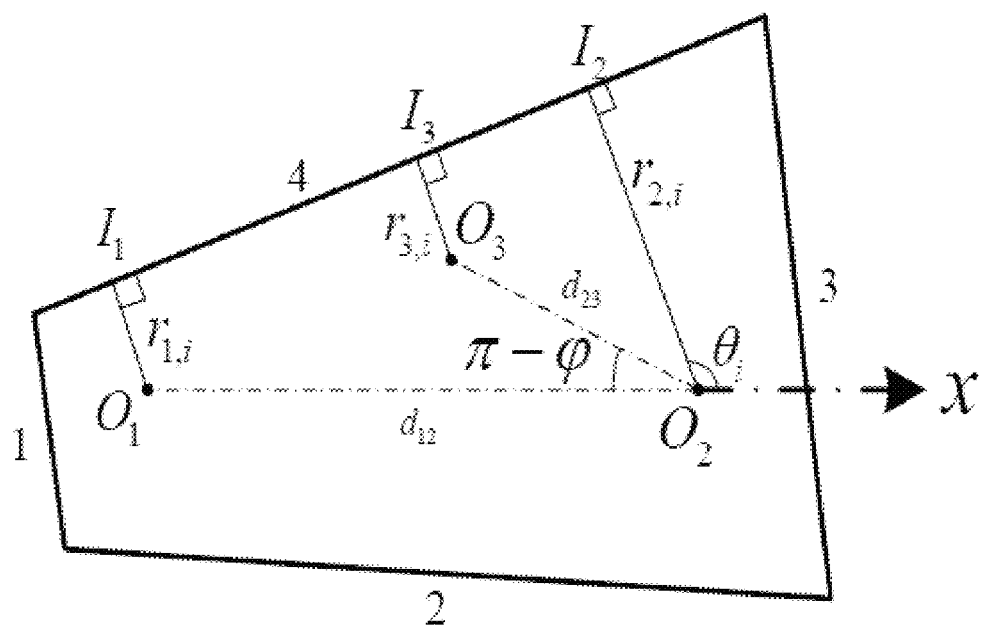
FIG. 7 is another schematic of room shape geometry according to the present invention.

Given parallel edges, however, higher order echoes may also satisfy (3) and (4). For instance, as shown in FIG. 7, suppose that wall 1 and 3 are parallel. Then, it is easy to verify that $$r_{j,131}-r_{j',131}=r_{j,1}-r_{j',1}$$

and $$r_{j,313}-r_{j',313}=r_{j,3}-r_{j',3}.$$

Where j≠j'. hence, (3) and (4) provide the same $\cos\theta_1$, $\cos\theta_3$, $\cos(\theta_1-\varphi)$ and $\cos(\theta_3-\varphi)$ if $r_{j,1}$ and $r_{j,3}$ are replaced by $r_{j,131}$ and $r_{j,313}$, respectively. By Lemma III.1, the third-order echoes resulting from a pair of parallel edges may lead to a larger room with the same norm vectors. Similarly, one can prove that given odd higher order echoes resulting from a pair of parallel edges leads to a larger room with the same norm vectors. Therefore, Lemma III.2 is proved.

Given Lemma III.1 and Lemma III.2, it is possible to conclude that the grouped first-order echoes provide either a unique room or a room with the smallest dimension. Then we have the following result on the identifiability of any convex polygonal room by using only first-order echoes.

Theorem III.3. One can recover, with probability 1, any convex planar K-polygon subject to reflection ambiguity, by using the first order echoes received at three random points in the feasible region, with known $d_{12}$ and $d_{23}$ and unknown $\varphi \in (0, 2\pi)$.

Remark 1: Both the room shape and the coordinate of $O_3$ are subject to reflection ambiguity for $\varphi \in (0, 2\pi)$. If, however, it is possible to limit $\varphi \in (0, \pi)$, the SLAM will be free of such ambiguity.

Remark 2: In reality, it is inevitable to collect reflection from the ceiling and the floor. However, by theorem III.3, if distances corresponding to the echoes from the ceiling and the floor are chosen, no polygon can be recovered as long as the trajectory is perpendicular to the walls.

Recovery with Known Length of $O_1O_2$

Geometry

Figure 8:
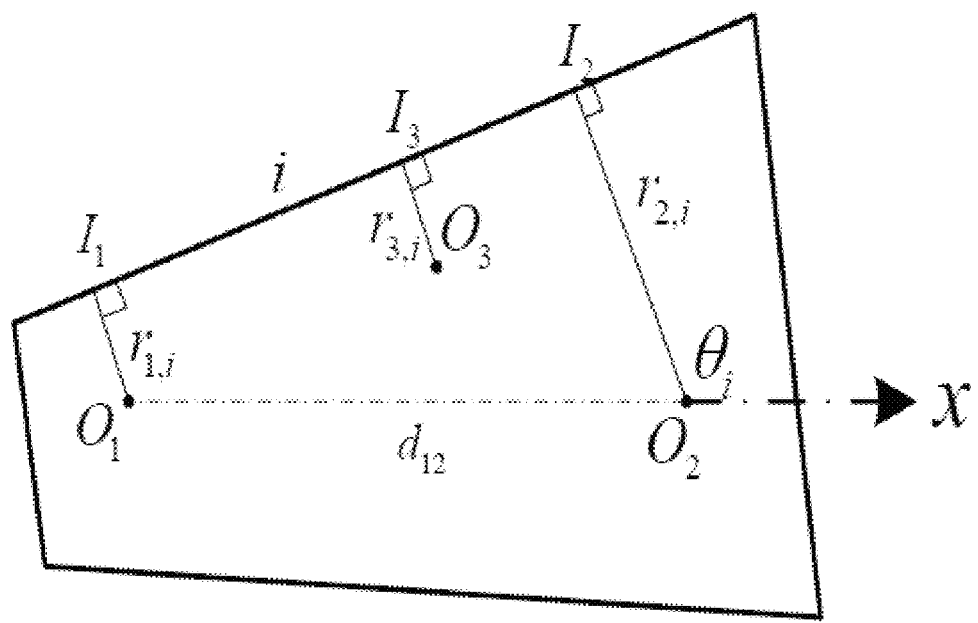
FIG. 8 is another schematic of a mobile device employed to measure the geometry of a room according to the present invention.

The path length obtained by motion sensors may have some errors. Additionally, some of the path lengths may not be accurate enough. In the case where either $d_{12}$ or $d_{23}$ is not accurate enough, the inaccurate path length is removed. Without loss of generality, assume only $d_{12}$ is known. As shown in FIG. 8, let $O_1$ be the origin and $O_2$ be on x-axis. But the direction of $\overrightarrow{O_1O_2}$ with respect to the desired room is also unknown. $O_3(x_3,y_3)$ $(y_3 \neq 0)$ is randomly chosen. By geometry, (4) can be rewritten as $$(r_{3,i}-r_{1,i})+x_3 \cos \theta_i + y_3 \sin \theta_i = 0. \quad (16)$$

(16) can also be rewritten in a matrix form $$A[x_3, y_3]^T = b, \quad (17)$$

where $A=[\cos \theta_i, \sin \theta_i]_{K \times 2}$ and $b=[-(r_{3,i}-r_{2,i})]_{K \times 1}$. Let $A(:,i)$ and $A(j,:)$ be the i th column and j th row of A, respectively.

Ideal Case

Similar to the previous section, it may be assumed that $r_{j,i}$'s have been correctly chosen from $\tilde{r}_j$ for j=1, 2,3 and i=1, . . . ,K. Then, since $\cos \theta_i$ is uniquely determined by (3), the remaining question is whether (17) provides a unique solution to $(x_3, y_3)$ and $\theta_i$'s given $\cos \theta_i$'s and b.

Lemma IV.1. Suppose acoustic signals are emitted and received at three non-collinear feasible points $O_i$ (i=1, 2, 3), where the coordinates of $O_i$ are randomly chosen. If either $d_{12}$ or $d_{23}$ is missing, then SLAM can be done for non-parallelogram subject to reflection ambiguity given grouped first-order echoes.

Proof Given grouped echoes, we can compute $\cos \theta_i$ by (3) for i ∈ {1, . . . , K}. Then $\sin \theta_i = \pm\sqrt{1-\cos^2 \theta_i}$. For simplicity, it is possible to assume that the ground truth of $\sin \theta_i$ is $\sqrt{1-\cos^2 \theta_i}$ for all i. Note that if $A[x,y]^T=b$ has a solution $(x_3,y_3)$ $(y_3>0)$, then $A^-[x,y]^T=b$ also has a solution $(x_3,-y_3)$ where $$A^-=[\cos \theta_i, -\sin \theta_i]_{K \times 2}$$

which is the reflection of the ground truth.

Assume $\forall i \in \{1, \ldots, K\}$, $\exists \alpha$ and $\beta$ $(\alpha, \beta \neq 0)$ such that $\alpha \cos \theta_i + \beta \sin \theta_i = 0$. Then $$\sqrt{\alpha^2 + \beta^2} \sin(\theta_i + \arctan \alpha/\beta) = 0. \quad (18)$$

Only $$\theta_i = -\arctan \frac{\alpha}{\beta} \text{ and } \theta_i = \pi - \arctan \frac{\alpha}{\beta}$$

make (18) hold. Since there are at least three walls with different $\theta_i$, rank(A)=2. Recall that as $(x_3,y_3)$ is a solution to (17), $$\text{rank}(A) = \text{rank}(\tilde{A}) = 2,$$

where $\tilde{A}=[A,b]$. In other words, given grouped first-order echoes and correct sign combination of $\{\sin \theta_i\}_{i=1}^K$, the room shape can be recovered without ambiguity if $y_3 > 0$. If the sign of $y_3$ is unknown, the reconstruction result is subject to reflection ambiguity.

Let $A_\pi$ be a matrix with sign combination of $\{\sin \theta_i\}$ different from the ground truth and its reflection and let $\tilde{A}_\pi = [A_\pi, b]$. Without loss of generality, it is possible to assume that the first two rows of $\tilde{A}$ are linearly independent. As a result, there is a linear row transform $F(\cdot)$ such that $$F(\tilde{A}) = \begin{bmatrix} \tilde{A}^*_{2 \times 3} \\ 0_{(K-2) \times 3} \end{bmatrix},$$

where $\tilde{A}^*_{2 \times 3} = \tilde{A}(1:2,:)$ is a full row rank matrix. Apply the linear row transformation $F(\cdot)$ to $\tilde{A}_\pi$, we have $$F(\tilde{A}_\pi) = \begin{pmatrix} A^*(:,1) & A^*(:,2) & A^*(:,3) \\ 0_{(K-2) \times 1} & A^{*\prime}(:,2) & 0_{(K-2) \times 1} \end{pmatrix},$$

where $A^{*\prime}(:,2)$ has at least 1 non-zero entry. Hence, rank($\tilde{A}_\pi$)=3 and no solution can be found.

Therefore only A and $A^-$ provide unique solution of (x,y) and (x,-y) respectively. In other words, SLAM is accomplished.

Echo Labeling

The following lemma guarantees that given ungrouped echoes, SLAM can be achieved in any convex polygon except parallelogram.

Lemma IV.2. Suppose acoustic signals are emitted and received at three non-collinear feasible points $O_j$ (j=1, 2, 3), where the coordinates of $O_j$ are randomly chosen. If either $d_{12}$ or $d_{23}$ is missing: (i) no solution to (3) and (16) can be found given un-grouped echo collected in any convex polygon free of parallel edges; and (i) multiple solutions to (3) and (16) can he found given ungrouped echo collected in any non-parallelogram convex polygon with parallel edges. But the dimension of the room is greater than the ground truth.

Proof. All odd higher order echoes resulting from parallel edges are excluded first. Given ungrouped echoes resulting from at least three non-parallel walls:

$$A' = [\cos \theta_{ii'}, \sin \theta_{ii'}]_{K \times 2}$$

and $$\tilde{A} = [A', b']$$

where i ∈ {1, . . . , $N_2$}, i' ∈ {1, . . . , $N_1$}, i≠i' for at least one entry, K' is not necessarily equal to K and the j th entry of b' is $-(r_{3,j'} - r_{2,j'})$. For simplicity, consider the case where $\sin \theta_{ii'} = \sqrt{1-\cos \theta_{ii'}}$ for all i. Similar to the proof of Lemma 4.1:

$$\text{rank}(A') = \text{rank}(A'_\pi) = 2,$$

where $A'_\pi$ is a matrix with signs of $\{\sin \theta_{ii'}\}$ different from A'. Let $\tilde{A}_\pi = [A'_\pi, b']$. Since b' is independent to $A'_\pi$, $$\text{rank}(\tilde{A}') = \text{rank}(\tilde{A}'_\pi) = 3.$$

Therefore, with probability 1 if the echo chosen according to some $f'_j$ contains echoes resulting from at least 3 non-parallel walls.

If echoes chosen contain odd higher order echoes resulting from a pairs of parallel walls, then the outward norm vectors remain invariant but the dimension becomes larger, which is similar to Lemma III.2.

Lemma IV.1 and IV.2 implies that for non-parallelogram convex polygon the grouped first-order echoes provides unique solution (subject to ambiguity) to (3) and (16) such that the reconstructed room shape is either the smallest one or the unique one. In other words, SLAM is accomplished by choosing the smallest room shape and the corresponding coordinate of $O_3$. The following lemma establishes that if either $d_{12}$ or $d_{23}$ is missing, parallelogram can not be recovered uniquely.

Lemma IV.3. Suppose acoustic signals are emitted and received at three non-collinear feasible points $O_j$ (j=1, 2, 3)

where the coordinates of $O_j$ are randomly chosen. If either $d_{12}$ or $d_{23}$ is missing, then parallelogram can not be reconstructed given ungrouped first-order echoes.

Proof.

An example may be given to show that if the shape of the room is a parallelogram, there exist multiple rooms satisfying (3) and (16). The ground truth is assumed to be $$A = \begin{bmatrix} \cos\theta_i & \sin\theta_i \\ \cos\theta_{i'} & \sin\theta_{i'} \\ \cos\theta_j & \sin\theta_j \\ \cos\theta_{j'} & \sin\theta_{j'} \end{bmatrix} \text{ and } b = \begin{bmatrix} -(r_{3,i} - r_{1,i}) \\ -(r_{3,i'} - r_{1,i'}) \\ -(r_{3,j} - r_{1,j}) \\ -(r_{3,j'} - r_{1,j'}) \end{bmatrix},$$

where $$r_{1,i} + r_{1,i'} = r_{2,i} + r_{2,i'} = r_{3,i} + r_{3,i'}$$

and $$r_{1,j} + r_{1,j'} = r_{2,j} + r_{2,j'} = r_{3,j} + r_{3,j'}.$$

Let $$A = \begin{bmatrix} \cos\theta_{ii'} & \sin\theta_{ii'} \\ \cos\theta_{i'i} & \sin\theta_{i'i} \\ \cos\theta_{jj'} & \sin\theta_{jj'} \\ \cos\theta_{j'j} & \sin\theta_{j'j} \end{bmatrix} \text{ and } b = \begin{bmatrix} -(r_{3,i} - r_{1,i'}) \\ -(r_{3,i'} - r_{1,i}) \\ -(r_{3,j} - r_{1,j'}) \\ -(r_{3,j'} - r_{1,j}) \end{bmatrix},$$

Then $$\cos\theta_{ii'} + \cos\theta_{i'i} = 0$$

and $$\cos\theta_{jj'} + \cos\theta_{j'j} = 0.$$

Moreover, since $\sin\theta = \pm\sqrt{1-\cos^2\theta}$.

$$\sin\theta_{ii'} + \sin\theta_{i'i} = 0$$

and $$\sin\theta_{jj'} + \sin\theta_{j'j} = 0$$

can hold if we manipulate the sign of square root properly. Then, $\text{rank}(A') = \text{rank}([A', b']) = 2$. Thus, a room shape and the coordinate of $O_3$ other than that of the ground truth and its reflection satisfies both (3) and (16).

Given lemma IV.1-IV.3, the following result on the identifiability of convex polygon except parallelogram is possible by using only first-order echoes.

Theorem IV.4. Suppose acoustic signals are emitted and received at three non-collinear feasible points $O_j$ ($j=1, 2, 3$) where the coordinates of $O_j$ are randomly chosen. If only the distance between two of the three the measurement points is known, then SLAM can be accomplished given ungrouped echoes any convex polygon except a parallelogram.

Practical Algorithm

Two distances between three consecutive measurement points are sufficient and necessary for SLAM given any convex polygon in 2-D. The remaining question is to make the algorithm robust in noisy case.

Peak-Detection Algorithm

A simple peak-detection algorithm may be used based on the idea that peaks have steep slopes. At the receiver, $|m^{(j)}(t)|$ is used instead of the original one. Since the LOS component is much stronger than reflective component, the LOS peak can be easily detected. Let $t_0^{(j)}$ be the time that at which the LOS peak in the correlator output. Suppose the nth local maxima after the LOS peak appear at $t_n^{(j)}$ with magnitude $m_n^{(j)}$ (n=1, 2, 3, ...) Then $(t_n^{(j)}, m_n^{(j)})$ are some points in the 2-D plane. Define the slopes of the peak centered at $(t_n^{(j)}, m_n^{(j)})$ to be $$g_{l,n}^{(j)} = \frac{m_n^{(j)} - m_{n-1}^{(j)}}{t_n^{(j)} - t_{n-1}^{(j)}}$$

And $$g_{r,n}^{(j)} = \frac{m_{n+1}^{(j)} - m_n^{(j)}}{t_{n+1}^{(j)} - t_n^{(j)}}.$$

A peak centered at $(t_n^{(j)}, m_n^{(j)})$ is said to be "steep" if $g_{l,n}^{(j)}$ and $-g_{r,n}^{(j)}$ are greater than the given positive threshold $g_{th}$. The experiment result suggest that $g_{l,n\pm 1}^{(j)}$ and $g_{r,n\pm 1}^{(j)}$ should also be considered. As a result, a peak centered at $(t_n^{(j)}, m_n^{(j)})$ is "steep" if one of the following conditions is satisfied:

$g_{l,n}^{(j)} > g_{th}$ and $-g_{r,n}^{(j)} > g_{th}$  1)

$\alpha_l g_{l,n}^{(j)} + (1-\alpha_l) g_{l,n}^{(j)} > g_{th}$ and $-g_{r,n}^{(j)} > g_{th}$  2)

$g_{l,n}^{(j)} > g_{th}$ and $-\alpha_r g_{r,n}^{(j)} - (1-\alpha_r) g_{r,n}^{(j)} > g_{th}$,  3)

$\alpha_l g_{l,n}^{(j)} + (1-\alpha_l) g_{l,n}^{(j)} > g_{th}$ and $-\alpha_r g_{r,n}^{(j)} - (1-\alpha_r) g_{r,n}^{(j)} > g_{th}$  3)

where $\alpha_l, \alpha_r \in (0,1)$ depend on $\{t_{n-2}^{(j)}, t_{n-1}^{(j)}, t_n^{(j)}\}$ and $\{t_n^{(j)}, t_{n+1}^{(j)}, t_{n+2}^{(j)}\}$, respectively. Hence, $\tau_i^{(j)}$'s can be obtained by detected peaks.

In practice, due to the non-ideal auto-correlation property, it is necessary to assume that no TDOA exists in $[0, t_{min}]$ and the time difference between contiguous peaks is greater than $\Delta t$. Two peaks are "close" to each other if the difference of their appearance time is less than $\Delta t$. Let M be the set of peaks steep enough and P be the set of detected peaks. Suppose the maximum distance between measurement points and the walls are less than $t_{max} c/2$. The peak detection algorithm can be summarized as Algorithm 1.

| Algorithm 1 Peak detection algorithm |
| --- |
| 1: find LOS peak $(t_0^{(j)}, m_0^{(j)})$. |
| 2: find local maxima appearing from $t_0^{(j)} + t_{min}$ to $t_0^{(j)} + t_{max}$. |
| 3: find all peaks that are "steep" and store them in M. |
| 4: store the peak with the largest magnitude of M in P. |
| 5: if then $|P| < |M|$ |
| 6: if there exist peaks in M whose locations are "close" to the stored peak then |
| 7: remove those peaks from M. |
| 8: end if |
| 9: end if |

Then the candidate distances are obtained by (2).

SLAM Given Distances Between Consecutive Measurement Points

In noisy case, the distances extracted from $m^{(j)}(t)$ are corrupted by the noise. Define $$\vec{r}_j = \tilde{r}_j + n_j$$

as the corrupted distances, where $n_j$ is the error. In the presence of noise, however, $\tilde{r}_j$ is subject to measurement errors. Hence $\varphi$ solved from (5) for different i's are not identical. The essential idea of a straightforward practical algorithm that handles the measurement errors is given below:
1) For K from 3 to N, choose K entries from $\tilde{r}_j$ (j=1, 2, 3), where N=min{$N_1$, $N_2$, $N_3$}.
2) For a given K, exhaust all possible echo combinations and compute $\varphi_i^k = \pm\arccos\alpha_i \pm \arccos\beta_i$ for each i, k and different sign combination, where i=1, ..., K and k=1, ..., $$\binom{N}{K}(K!)^2.$$

3 Choose the echo and sign combination with minimum variance of $\varphi_i^k$ for a given K. Then choose the largest K and the corresponding echo and sign combination with the variance less than the threshold. (variance criterion)
4) Estimate $\theta_i$'s and $\varphi$ using the obtained combination of echoes and reconstruct the polygon.
5) If some $\theta_i$'s are close to each other, then keep the one corresponding to the smallest distance between $O_1$ and the walls.

The corresponding algorithm is summarized as Algorithm 2.

SLAM Given The Distance Between Two Measurement Points

In a noisy case, the echo and sign combination is chosen such that the matrix is close to a rank-2 matrix. A straightforward idea of the practical algorithm that handles the measurement errors is given below and the practical algorithm is summarized as Algorithm 3.
1) For K from 3 to N, choose K entries from $\tilde{r}_j$ (j=1, 2, 3), where N=min{$N_1$,$N_2$,$N_3$}.
2) For a given K, exhaust all possible echo combinations and compute $\cos\theta_i$ and $\sin\theta_i$ for each i, k and different sign combination, where i=1, ..., K and k=1, ..., $$\binom{N}{K}(K!)^2.$$

Then compute the minimum distance between $\tilde{A}_{ik}$ and any rank-2 matrix.
3) For each K, find $\tilde{A}_{ik}$ with the least distance to any rank-2 matrix.
4) If unique solution of O(x,y) (y>0) can be obtained, choose the echo and sign combination resulting in unique solution with minimum distance between $\tilde{A}_{ik}$ and any rank-2 matrix for a given K. Then choose $\tilde{A}_{ik}$ with the largest k such that the distance between $\tilde{A}_{ik}$ and any rand-2 matrix is less than the threshold.
5) Estimate $\theta_i$'s and $(x_3,y_3)$ using the chosen $\tilde{A}_{ik}$ and reconstruct the polygon.
6) If some $\theta_i$'s are close to each other, then keep the one corresponding to the smallest distance between $O_1$ and the walls.

| Algorithm 2 Reconstruct convex polygon given distances between consecutive measurement points |  |
|---|---|
| 1: | Set i = 3 and variance threshold $V_{th}$ |
| 2: | if i ≤ N then |

-continued

| Algorithm 2 Reconstruct convex polygon given distances between consecutive measurement points |  |
|---|---|
| 3: | Set th = inf |
| 4: | Choose one echo combination with i elements from $\left(\binom{N}{K}\right)^3 (K!)^2$ feasible echo combinations |
| 5: | Compute $\theta_i$'s and $\varphi$ by the chosen echo combination |
| 6: | if $\theta_i$'s and $\varphi$ are obtained given certain sign combinations then |
| 7: | Compute Var[$\varphi$], which is the variance of $\varphi$ |
| 8: | if Var[$\varphi$] < th then |
| 9: | Keep the echo and sign combination and set th = Var[$\varphi$] |
| 10: | end if |
| 11: | else if There exist echo combinations that has not been chosen yet then |
| 12: | Return to step 4 |
| 13: | end if |
| 14: | i = i + 1 |
| 15: | else |
| 16: | Choose the recovered room with the largest number of walls such that Var[$\varphi$] < $V_{th}$ |
| 17: | end if |
| 18: | Keep the edges that form a shape with smallest area. |

| Algorithm 3 Reconstruct convex polygon given one of the distances between consecutive measurement points |  |
|---|---|
| 1: | Set i = 3 and distance threshold $d_{th}$ |
| 2: | if i ≤ N then |
| 3: | Set d = inf |
| 4: | Choose one echo combination with i elements from $\left(\binom{N}{K}\right)^3 (K!)^2$ feasible echo combinations |
| 5: | Compute $\cos\theta_i$'s and $\sin\theta_i$ by the chosen echo combination |
| 6: | if $\cos\theta_i$'s and $\sin\theta_i$'s are valid given certain sign combinations then |
| 7: | Compute d($\tilde{A}$), the distance between $\tilde{A}$ and any rank-2 matrix |
| 8: | if d($\tilde{A}$) < d then |
| 9: | Store the echo and sign conibination and set d = d($\tilde{A}$) |
| 10: | end if |
| 11: | else if There exist echo combinations that has not been chosen yet then |
| 12: | Return to step 4 |
| 13: | end if |
| 14: | i = i + 1 |
| 15: | else |
| 16: | Choose the recovered room with the largest number of walls such that d($\tilde{A}$) < $d_{th}$ |
| 17: | end if |
| 18: | Keep the edges that form a shape with smallest area. |

EXAMPLE

Since a rectangle is the most common shape of the room, the method proposed in Section III for the present invention was tested by a real room. Since the three-order echoes resulting from parallel walls only change the dimension of the room, only the first- and second-order echoes were considered.

Given Two Distances of Three Consecutive Measurement Points

Using a laptop as microphone 18 and a HTC M8 phone as a loudspeaker 16, the speaker of the cell phone was placed towards each wall to ensure the corresponding first order echo is strong enough as the loudspeaker of the cell phone is not omnidirectional and power limited. Note that the loudspeaker will record both first order echoes and some higher order ones.

Figure 9A:
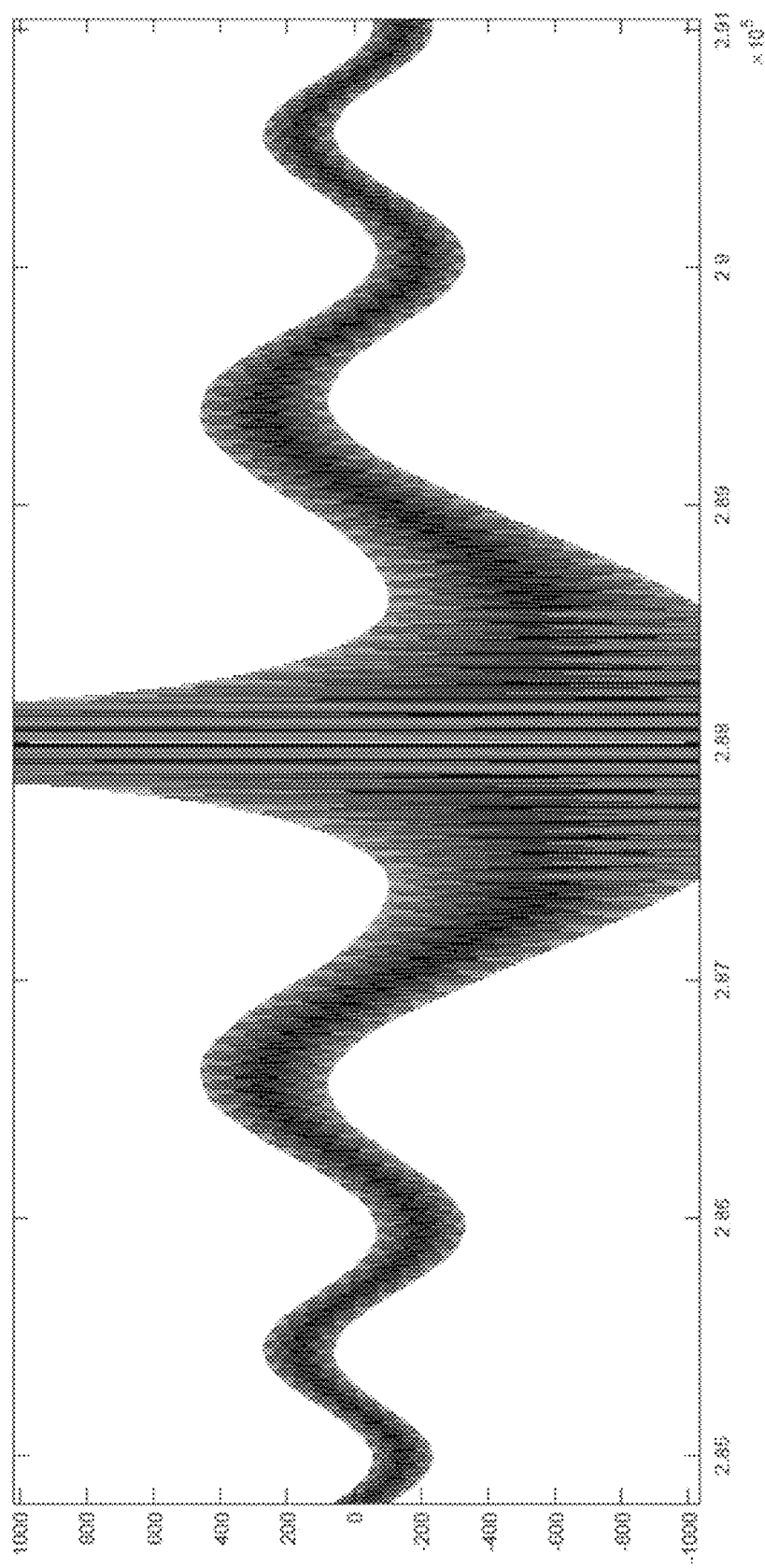
FIG. 9A is a graph of a transmitted signal convolved with itself according to the present invention.
Figure 9B:
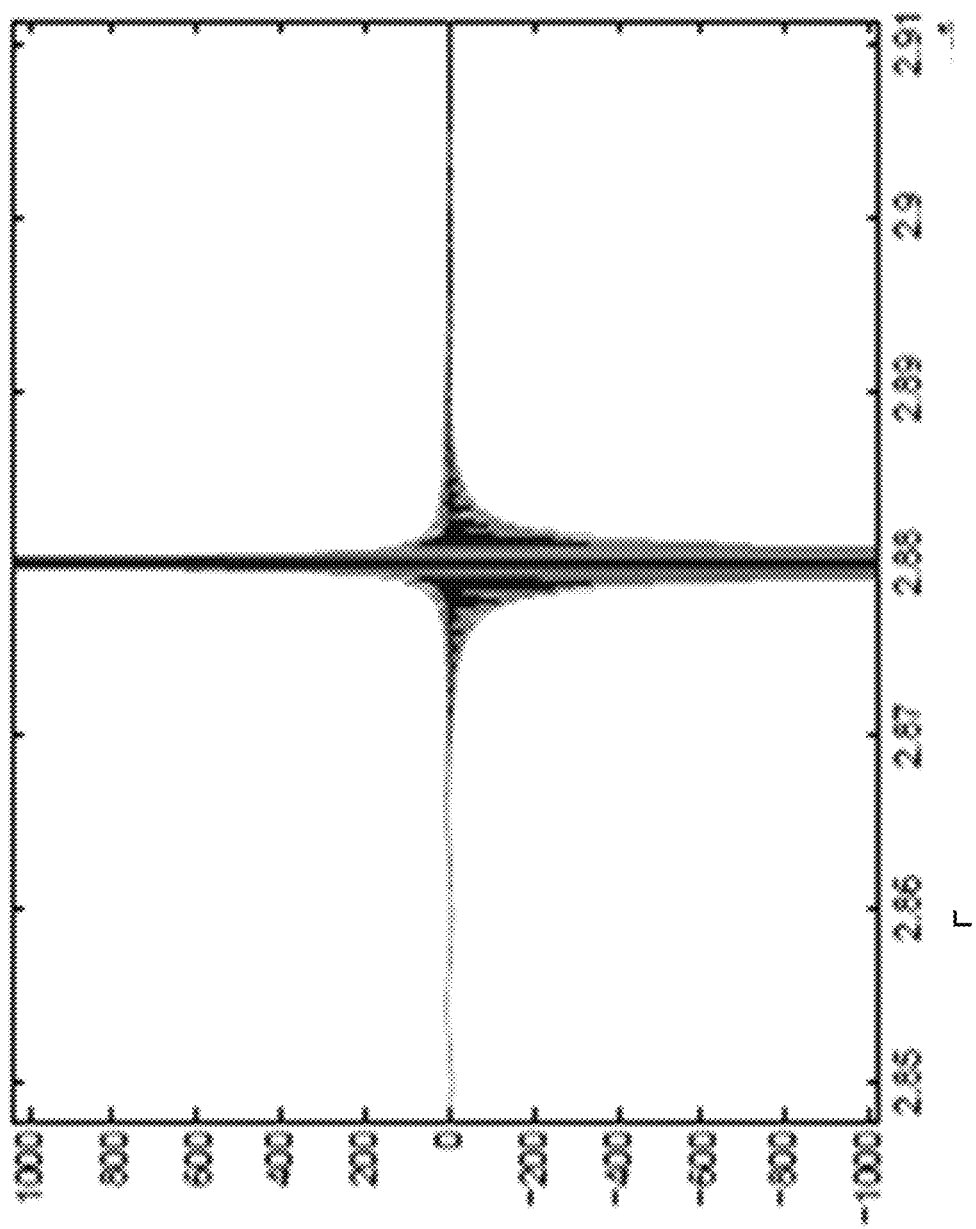
FIG. 9B is a graph of a transmitted signal convolved with its windowed version according to the present invention.

A chirp signal linearly sweeping from 30 Hz to 8 kHz was emitted by the cell phone. The sample rate at the receiver is $f_s$=96 kHz. It has been shown in the art that if the input chirp signal is correlated with its windowed version, the output may resemble a delta function. The simulation shows that the candidate distances obtained by correlating the received signals with its triangularly windowed version outperforms the correlator output using the original one. The comparison is shown in FIG. 9.

Figure 10A:
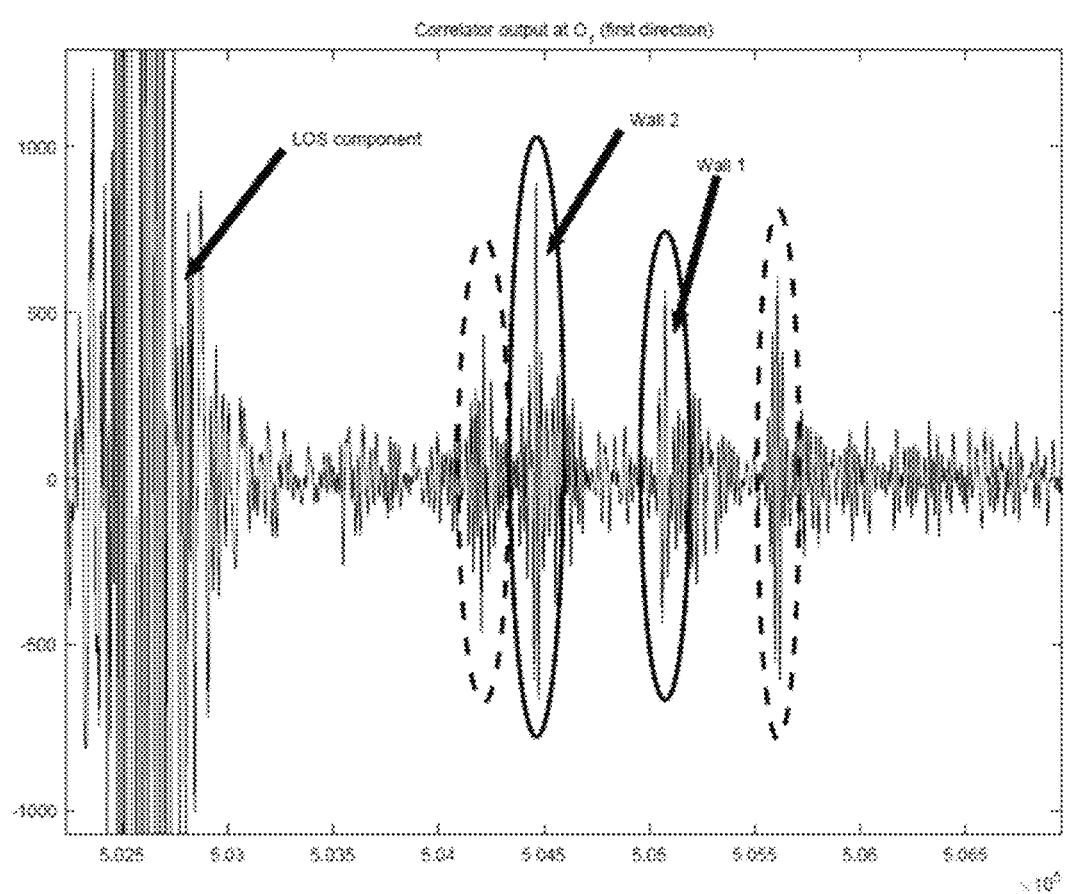
FIG. 10A is a graph of correlator outputs according to the present invention.
Figure 10B:
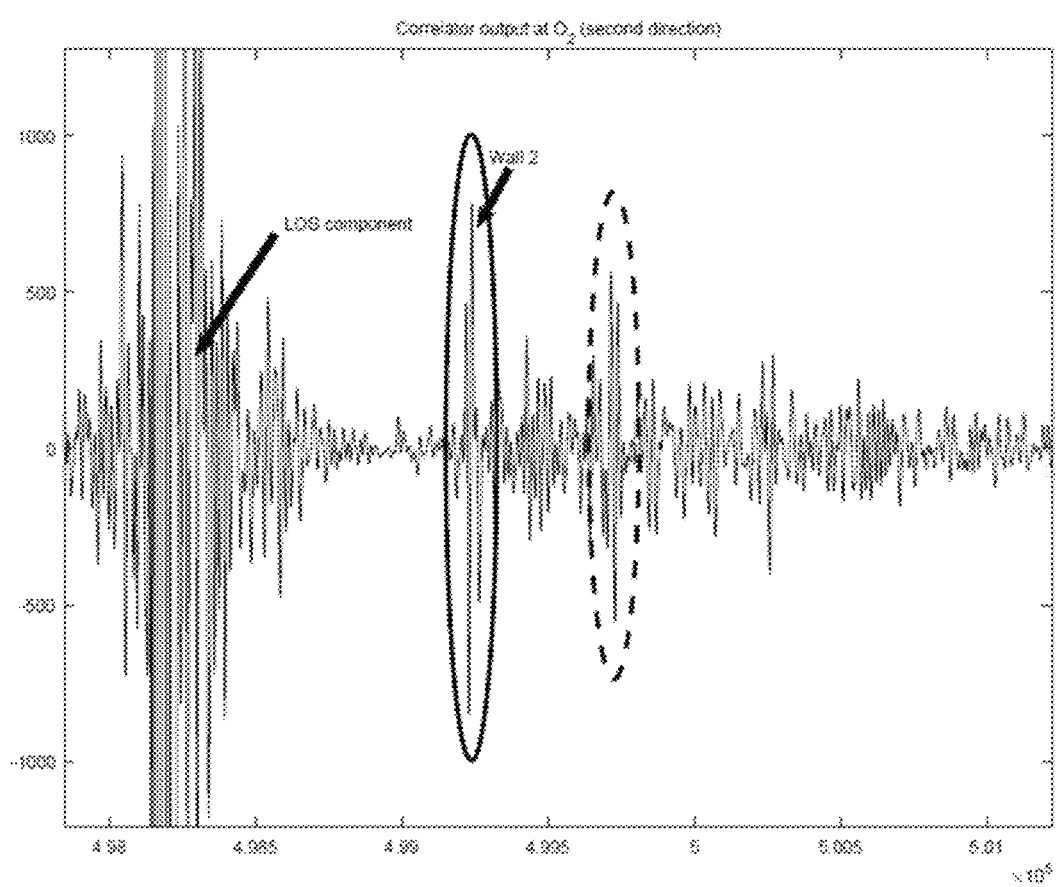
FIG. 10B is a graph of correlator outputs according to the present invention.
Figure 10C:
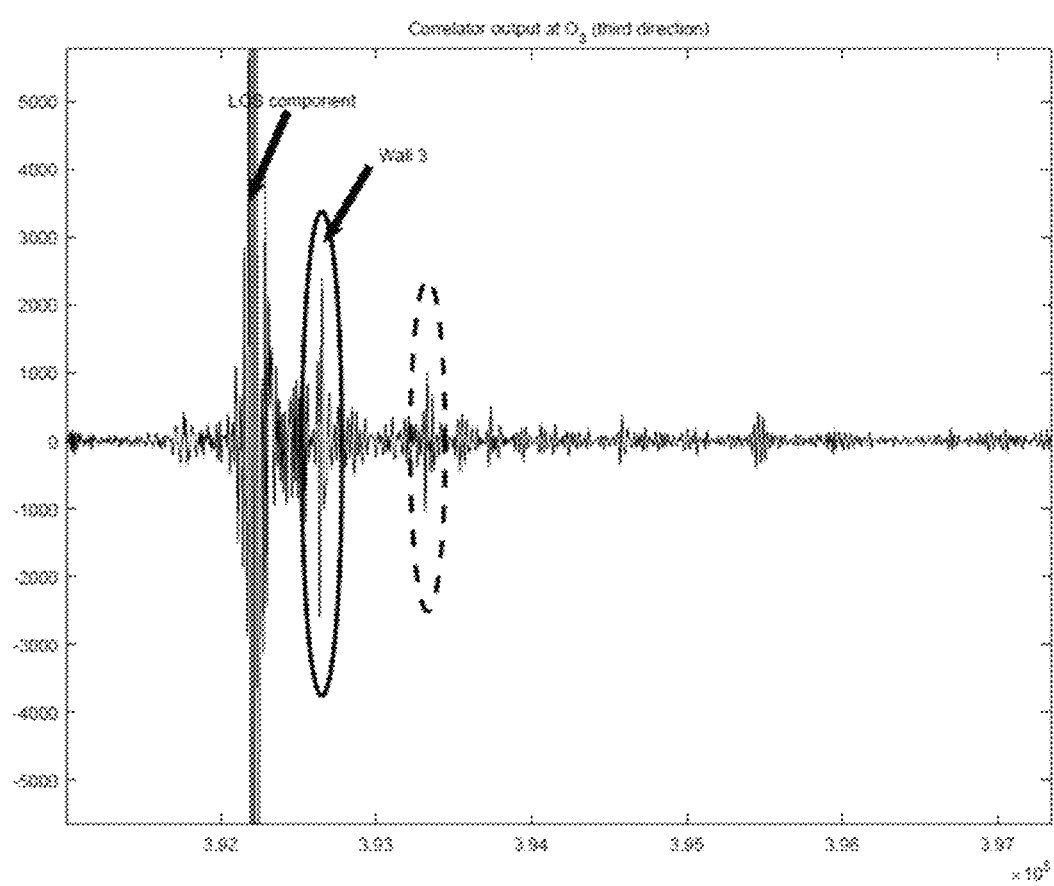
FIG. 10C is a graph of correlator outputs according to the present invention.
Figure 11A:
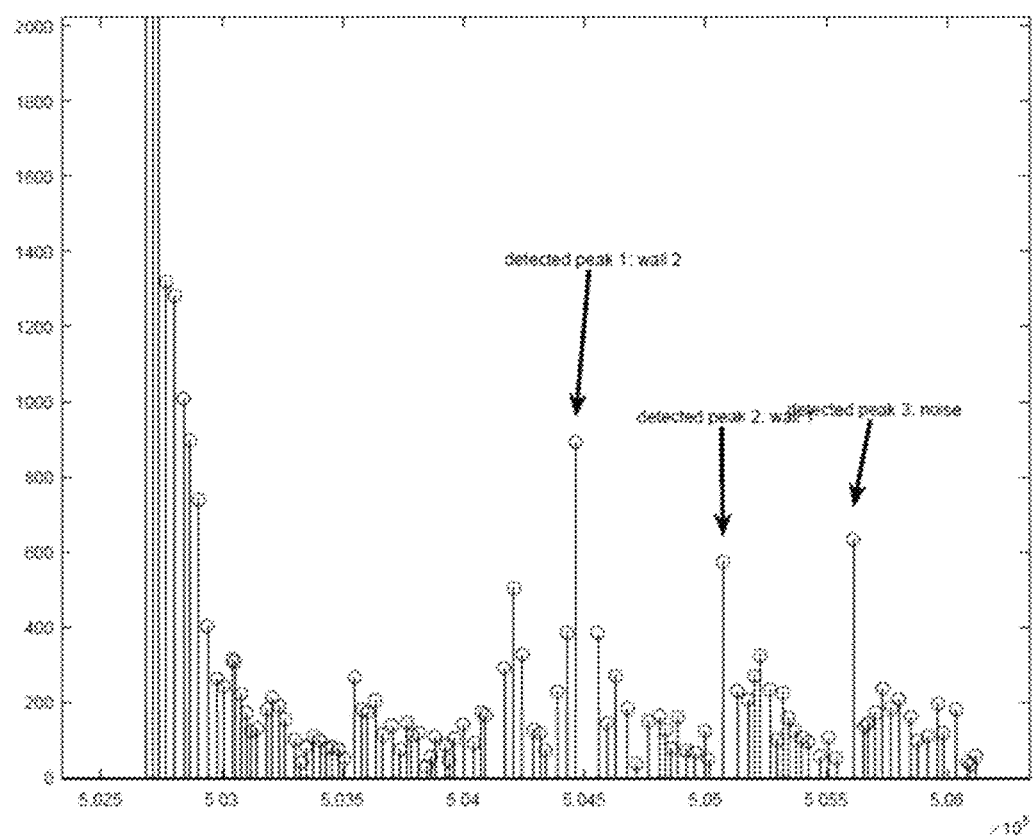
FIG. 11A is a graph of peak detection according to the present invention.
Figure 11B:
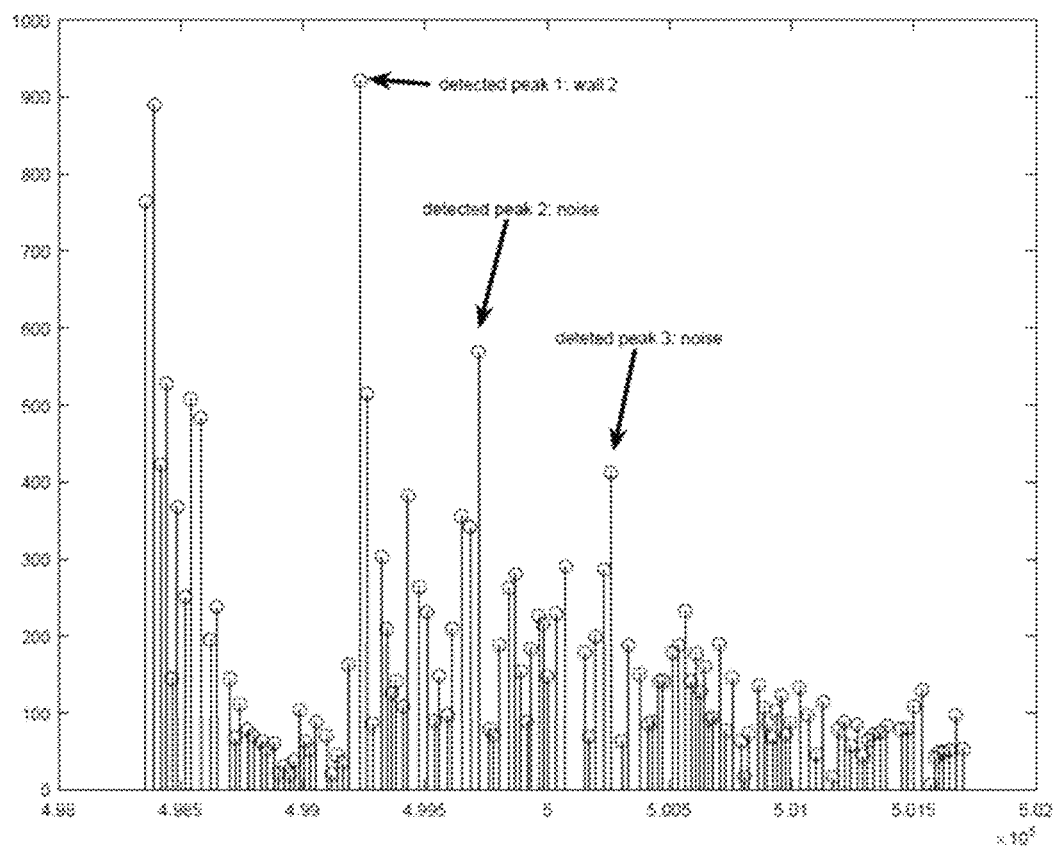
FIG. 11B is a graph of peak detection according to the present invention.
Figure 11C:
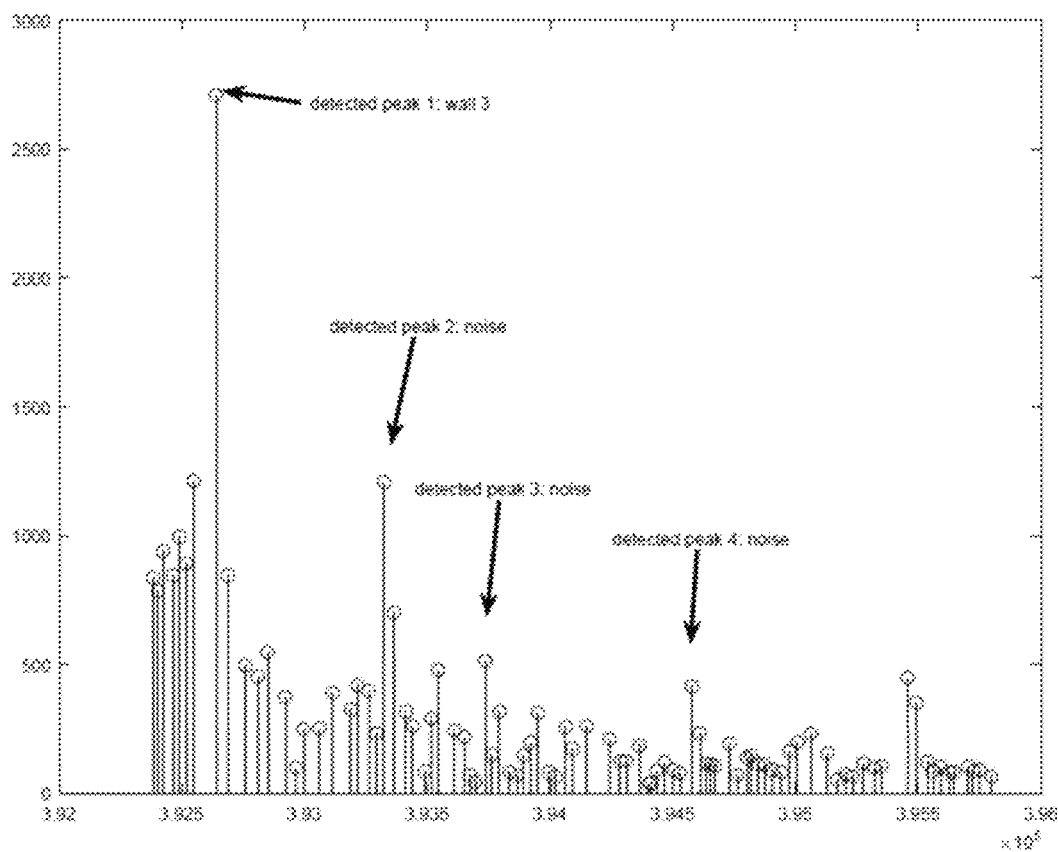
FIG. 11C is a graph of peak detection according to the present invention.

FIGS. 10A-10C is a sample path of the correlator output collected in the room where this experiment is conducted. Peaks with ellipse in FIGS. 10A-10C are determined manually. Then Algorithm 1 is used to detect desired peaks from the correlator output. We also assume that the distance between walls and measurement points are between 0.6 m and 6.5 m. The minimum difference of appearance time is $$\Delta t = \frac{0.5 \text{ m}}{c},$$

where c=346 m/s. $g_{th}$ is set to be $5f_s$. Under these assumptions, local maxima of FIGS. 10A-10C are shown in FIGS. 11A-11C and peaks detected by Algorithm 1 are pointed by arrows. The desired peaks were always detected. In order to detect less peaks, in the presence of noise, one possible modification of Algorithm 1 is to ignore all peaks with magnitude less than a predetermined threshold. Notably, only part of the detected echoes are used for reconstruction due to computational complexity.

Figure 12:
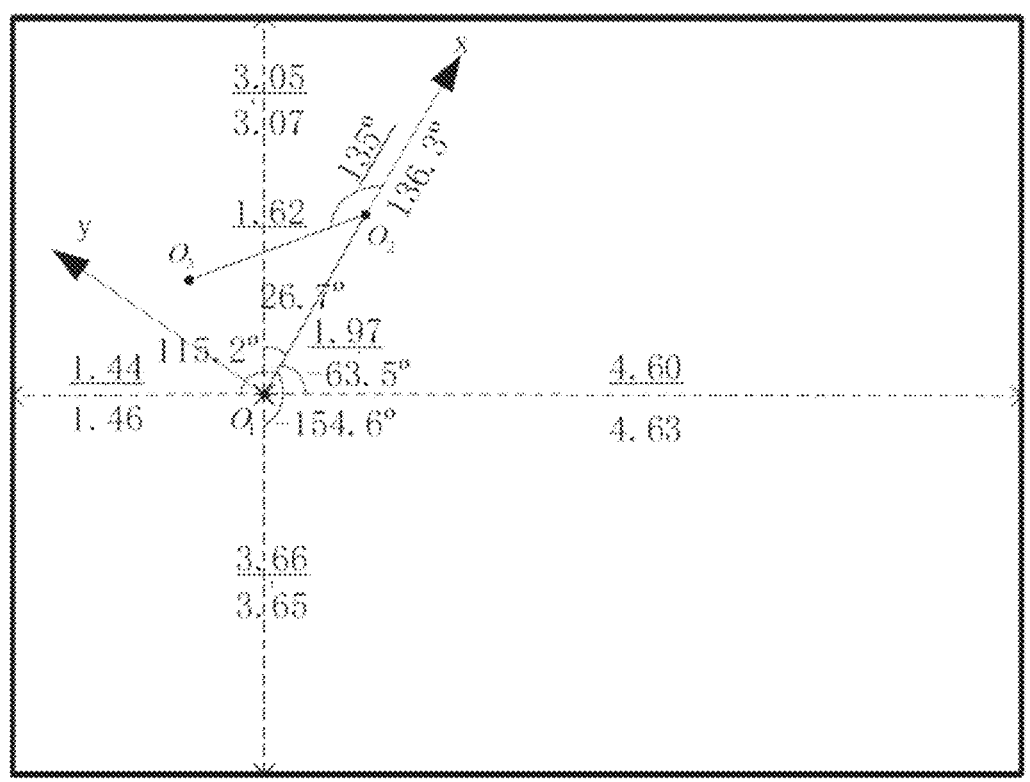
FIG. 12 is a graph of a comparison between the ground truth and experiment result according to the present invention.

The proposed algorithm for SLAM is verified by experiment in which $d_{12}$ and $d_{23}$ are measured with a tape measure. Even if some elements of $r_j$ have measurement errors up to 10 cm, SLAM is accomplished with small error of both the room shape and the coordinate of $O_3$ by the proposed algorithm given only first-order echoes. In the presence of higher order echoes, the proposed algorithm performs poorly when the variance criterion is the only criterion used to determine the correct combination of echoes. Since most rooms are regular, a heuristic constraint is added: all the angles of two adjacent walls are between 50° and 130°. An interesting phenomenon is that sometimes the proposed algorithm is unable to provide the correct room shape, but the estimate of c is always close to the true value. Therefore, one can use the algorithm in Section III to obtain c and then reconstruct the room shape independently with full knowledge of the geometry information of the measurement points. The comparison between the SLAM result and the ground truth is illustrated in FIG. 12.

Given the Distance Between $O_1$ and $O_2$

Here it is assumed that $O_3$ lies always above x-axis, i.e., $y_3$>0. Thus SLAM result is free of ambiguity. In noiseless case, simulations show that the algorithm of the present invention achieves successful SLAM given all the first-order echoes and some second-order echoes. In noisy case, the candidate distances, including all that correspond to the first-order echoes and some correspond to the second-order echoes, are corrupted by the Gaussian noise with N (0, $0.005^2$). Heuristic constraint in the last section is also applied. Two rooms are used to test the proposed algorithm. For room 1, assume that $O_2$ (1,0) and $O_3$(1,1). Then $d_{12}$=1 and $d_{23}$=1.1180. The distances between walls and measurement points and the real angles of the walls are given in table I and table II.

TABLE I

Real distances of room 1

| | $O_1$ | $O_2$ | $O_3$ |
|---|---|---|---|
| wall 1 | 1.4142 | 2.1213 | 1.0607 |
| wall 2 | 1.3093 | 1.9640 | 2.3926 |
| wall 3 | 1.5 | 1 | 2.1160 |
| wall 4 | 2.5981 | 1.7321 | 1.6651 |

TABLE II

Real angles of room 1

| wall 1 | wall 2 | wall 3 | wall 4 |
|---|---|---|---|
| 135° | −130° | −60° | 30° |

The sample of the corrupted distances and the recovered angles are given in table III and IV, respectively.

TABLE III

Sample of corrupted distance of room 1

| | $O_1$ | $O_2$ | $O_3$ |
|---|---|---|---|
| wall 1 | 1.4178 | 2.1276 | 1.0485 |
| wall 2 | 1.3124 | 1.9749 | 2.3814 |
| wall 3 | 1.4914 | 1.0111 | 2.1160 |
| wall 4 | 2.5978 | 1.7324 | 1.6804 |

TABLE IV

Recovered angle of room 1

| wall 1 | wall 2 | wall 3 | wall 4 |
|---|---|---|---|
| 129.5125° | −131.4876° | −66.0266° | 29.0305° |

The parameters of the second room are given table V and VI. Assume that $O_2$(0.5,0) and $O_3$(⅓,0.5). Then $d_{12}$=0.5 and $d_{23}$=0.5270.

TABLE V

Real distances of room 2

| | $O_1$ | $O_2$ | $O_3$ |
|---|---|---|---|
| wall 1 | 1.7889 | 2.2361 | 1.8634 |
| wall 2 | 1.4142 | 1.7678 | 2.0035 |
| wall 3 | 1.8974 | 1.7393 | 2.2663 |
| wall 4 | 3.3282 | 3.0509 | 2.7273 |

TABLE VI

Real angles of room 2

| wall 1 | wall 2 | wall 3 | wall 4 |
|---|---|---|---|
| 153.4349° | −135° | −71.5651° | 56.3099° |

The simulation result is shown in table VII and VIII.

TABLE VII

Sample of corrupted distances of room 2

| | $O_1$ | $O_2$ | $O_3$ |
|---|---|---|---|
| wall 1 | 1.7879 | 2.2290 | 1.8705 |
| wall 2 | 1.4187 | 1.7702 | 2.0049 |
| wall 3 | 1.8935 | 1.7384 | 2.2673 |
| wall 4 | 3.3212 | 3.0499 | 2.7352 |

TABLE VIII

Recovered angles of room 2

| wall 1 | wall 2 | wall 3 | wall 4 |
|---|---|---|---|
| 151.9001° | −134.6765° | −71.9195° | 57.1366° |

From the simulation result, it may be seen that in a noisy case the present invention can reconstruct the room shape given $d_{12}$. But in both cases, the present invention was unable to obtain the coordinate obtained by the corrupted distances. The possible reason is that the angles of the walls are estimated directly by the elements of A, while the coordinate of $O_3$ is obtained by $$\begin{bmatrix} x_3 \\ y_3 \end{bmatrix} = A^{-1}b.$$

$A^{-1}$ is more vulnerable to noise than A. Thus, the coordinate of $O_3$ may not be obtained in noisy case while the norm vector of the walls can be estimated.

The present invention makes progress in acoustic SLAM integrating measurement from internal motion sensors along with echo measurements for localization and mapping. A simple approach based on gradient test is used to detect peaks of the correlator output which are used to compute candidate distances. Experiment results show that the developed system can recover all desired first order echoes along with some high order echoes as well as some spurious peaks. With the distances between consecutive measurement points obtained through internal sensors, the present invention can recover any 2-D convex polygon while self-localizing using the collected acoustic echoes. In the presence of noise, a simple algorithm is devised that is effective in recovering the room shape even in the presence of higher order echoes.

The present invention may also be applied for 3D SLAM, which has found applications for both navigation and construction monitoring. The present invention can be extended to the 3D case: it can be shown that, in an idealized case, four measurement points that do not reside on a single plane can recover any convex 3D polyhedron when distances between consecutive measurement points (in this case there are three of them) are known. Other interesting problems include 3D SLAM for shoebox rooms as they are one of the most encountered rooms in practice. For a shoebox, the outward norm vectors are always subject to rotation and translation ambiguity due to its symmetry therefore only the coordinates of the measurement points and the dimension of the shoebox are of interest. For a shoebox, fewer than four measurement points may be needed when complete set of first order echoes (in this case including from floor and ceiling) are available. Additionally, many room shapes besides shoebox have some special structural information that can be exploited. For instance, the floor is almost always perpendicular to the walls and there often exist two adjacent walls that are perpendicular to each other. This structural information, namely three connected planes are perpendicular to each other, can be explored for echo labeling, which is more challenging for 3D SLAM. Even with labeled echoes, 3D SLAM often requires solving a bilinear optimization problem for arbitrary convex polyhedra whose corresponding cost function is non-convex and thus multiple local minima exist. Clearly, having more measurement points or other geometry information may impose additional constraints and can help resolve the inherence ambiguity, i.e., in identifying the correct solution.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A device for performing simultaneous localization and mapping in an enclosed space, comprising:
    a loudspeaker positioned in the device and capable of emitting a predetermined sound from the device;
    a microphone co-located with the loudspeaker in the device;
    a processor interconnected to the microphone;
    wherein the processor is programmed to receive a series of echoes of the predetermined sound when emitted by the loudspeaker from a corresponding series of non-collinear locations of the co-located microphone and loudspeaker within the enclosed space and to determine shape of the enclosed space based on the series of echoes from the corresponding series of locations; and
    wherein the processor is programmed to determine the shape of the enclosed space by measuring the distance between each of the series of locations from a preceding one of the series of locations and all walls of the enclosed space.

2. The device of claim 1, wherein the processor is programmed to determine the shape of the enclosed space by identifying first order echoes from within the series of echoes received at each of the corresponding series of locations.

3. The device of claim 2, wherein the processor is programmed to determine shape of the enclosed space by reconstructing all possible shapes of the enclosed space and selecting the shape with the most number of edges.

4. The device of claim 3, wherein the processor is programmed to determine the location the series of non-collinear locations within the shape of the enclosed space.

5. The device of claim 4, wherein the predetermined sound comprises a chirp signal sweeping from a first frequency to a second frequency.

6. The device of claim 5, wherein the first frequency is 30 Hz and the second frequency is 8 kHz.

7. A method of performing simultaneous localization and mapping in an enclosed space, comprising:
   providing a loudspeaker in a device that is capable of emitting a predetermined sound from the device;
   emitting the predetermined sound from the loudspeaker from each of a series of locations within the enclosed space;
   receiving a corresponding series of echoes of the predetermined sound from each of the series of locations with a microphone of the device that is co-located with the loudspeaker;
   using a processor interconnected to the microphone to determine shape of the enclosed space based on the series of echoes received from the corresponding series of locations by measuring the distance between each of the series of locations from a preceding one of the series of locations and all walls of the enclosed space.

8. The method of claim 7, wherein the processor is programmed to determine the shape of the enclosed space by identifying first order echoes from within the series of echoes received at each of the corresponding series of locations.

9. The method of claim 8, wherein the processor is programmed to determine shape of the enclosed space by reconstructing all possible shapes of the enclosed space and selecting the shape with the most number of edges.

10. The method of claim 9, wherein the processor is programmed to determine the location the series of non-collinear locations within the shape of the enclosed space.

11. The method of claim 10, wherein the predetermined sound comprises a chirp signal sweeping from a first frequency to a second frequency.

12. The method of claim 11, wherein the first frequency is 30 Hz and the second frequency is 8 kHz.

* * * * *